US011825399B2

(12) United States Patent
Akhavain Mohammadi et al.

(10) Patent No.: US 11,825,399 B2
(45) Date of Patent: Nov. 21, 2023

(54) METHOD AND APPARATUS FOR DATA ROUTING USING MOVING COMMUNICATION NODES

(71) Applicant: Huawei Technologies Co., Ltd., Shenzhen (CN)

(72) Inventors: Mehdi Arashmid Akhavain Mohammadi, Markham (CA); William Carson McCormick, Markham (CA); Peter Ashwood-Smith, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 17/392,822

(22) Filed: Aug. 3, 2021

(65) Prior Publication Data

US 2023/0039699 A1 Feb. 9, 2023

(51) Int. Cl.
*H04W 40/20* (2009.01)
*H04W 76/10* (2018.01)
*H04W 84/00* (2009.01)

(52) U.S. Cl.
CPC ........... *H04W 40/20* (2013.01); *H04W 76/10* (2018.02); *H04W 84/005* (2013.01)

(58) Field of Classification Search
CPC .... H04W 40/20; H04W 76/10; H04W 84/005
See application file for complete search history.

(56) References Cited

U.S. PATENT DOCUMENTS

| 8,160,078 B2* | 4/2012 | Chen | H04W 40/28 370/351 |
| 2015/0312837 A1* | 10/2015 | Baldwin | H04W 4/027 370/252 |
| 2017/0289896 A1* | 10/2017 | Onishi | H04L 67/12 |
| 2020/0028804 A1 | 1/2020 | Ergen | |

(Continued)

FOREIGN PATENT DOCUMENTS

| CN | 102802121 A | 11/2012 |
| CN | 104618981 A | 5/2015 |

(Continued)

OTHER PUBLICATIONS

National Mobile Communications Research Laboratory, Southeast University, Nanjing, Jiangsu, P. R. of China ;Jun Zheng, Hui Tong; Zhenyu Wang; Yuying Wu; A Destination and Moving Direction Information Based Probabilistic Routing Protocol for VANETs, Dec. 4-8, 2016; IEEE, pp. 1-5.*

(Continued)

*Primary Examiner* — Hashim S Bhatti
(74) *Attorney, Agent, or Firm* — Slater Matsil, LLP

(57) ABSTRACT

A method and apparatus for transmitting data using moving communication nodes. A network element can communicate with a plurality of moving communication simultaneously. The network element identifies a plurality of potential initial nodes for transmitting data to a desired destination. The network element can then evaluate each of the potential initial nodes using one or more selection criteria. The initial node can be selected from the plurality of potential initial (Continued)

nodes as the potential initial node that best satisfies the selection criteria. The transmission to the initial node can act as the first link in a data route from the network element to the desired geographic destination.

22 Claims, 9 Drawing Sheets

(56) References Cited

U.S. PATENT DOCUMENTS

2020/0186980 A1\* 6/2020 Furuyama ........... H04W 84/005
2022/0299334 A1\* 9/2022 Tsubosaka ............ G06F 16/909

FOREIGN PATENT DOCUMENTS

| CN | 105246119 A | 1/2016 |
| CN | 106961707 A | 7/2017 |
| WO | 2015071792 A1 | 5/2015 |

OTHER PUBLICATIONS

Shen, J., et al., "A Priority Routing Protocol Based on Location and Moving Direction in Delay Tolerant Networks", IEICE Trans. Inf. & Syst., vol. E93-D, No. Oct. 10, 2010, 13 Pages.

\* cited by examiner

METHOD AND APPARATUS FOR DATA ROUTING USING MOVING COMMUNICATION NODES

TECHNICAL FIELD

Embodiments of the present invention relate generally to data routing, and more particularly to methods and apparatuses for data routing in communication systems using moving communication nodes.

BACKGROUND

The following is not an admission that anything discussed below is part of the prior art or part of the common general knowledge of a person skilled in the art.

To transmit data between endpoints in a communication network, data units such as packets are typically routed through a series of intermediate network nodes. The path along which data is transmitted can significantly impact the time required for the data to reach its destination as well as the reliability of the data reaching its destination. Routing is the process of selecting the path along which data will travel. Depending on the arrangement of nodes within a network, the complexity required to route a data packet will vary.

As communication systems increasingly use mobile communication nodes such as satellites or drones, routing becomes increasingly complex. In such systems, the nodes of the communication network are themselves mobile and their movement might spread across a large geographical area. The mobile nature of the communication nodes can result in networks with hyper dynamic topologies where peer adjacencies are in constant churn. As a result, the network topology itself changes constantly. It is therefore desired to have a method of routing that efficiently accounts for the motion of nodes and the churn in topology.

SUMMARY

The following introduction is provided to introduce the reader to the more detailed discussion to follow. One or more inventions may reside in any combination or subcombination of the elements or process steps disclosed in any part of this document including its claims and figures.

The present disclosure relates to communication systems using moving communication nodes. In particular, the present disclosure relates to systems, methods and apparatuses for selecting an initial node for a data transmission being routed to a desired geographic destination using moving communication nodes. A network element that is transmitting a data unit (e.g. a data frame or a data packet) can establish simultaneous data communication links with multiple moving communication nodes. The network element can select a particular one of these moving communication nodes to which the data unit should be transmitted in order to optimize one or more route selection criteria. In some cases, the route selection criteria may be specific to a data unit being transmitted (e.g. minimizing the distance travelled to reach the geographic destination). While in other cases, the routing selection criteria may be defined to optimize the performance of a given node or node cohort or to satisfy geographic constraints on the data being transmitted (e.g. avoiding routing over regions where interception is strategically undesirable).

In a broad aspect of this disclosure, a network element can identify a plurality of potential initial nodes that are in data communication with the network element. The network element can then evaluate each of the potential initial nodes using one or more selection criteria. The initial node can be selected from the plurality of potential initial nodes as the potential initial node that best satisfies the one or more selection criteria. The network element then transmits the data unit to the initial node. The transmission to the initial node can act as the first link in a data route from the network element to the desired geographic destination.

In accordance with this broad aspect, there is provided a routing method implemented by a network element, the method comprising: determining, for each of a plurality of electronic moving communication nodes in wireless data communication with the network element, a node motion direction corresponding to a direction of motion of the moving electronic communication node; selecting an initial node from the plurality of electronic moving communication nodes based on a data unit geographic destination for an electronic data unit and the node motion direction of the initial node; and transmitting the electronic data unit to the initial node. For example, the initial node may be selected in response to determining that the corresponding node motion direction is expected to provide a transmission path to the data unit geographic destination that has the lowest delay.

In some examples, the initial node may be selected by: identifying a desired node motion direction as the node motion direction that enables the electronic data unit to be routed between the network element and the data unit geographic destination using a least number of communication nodes.

In some examples, the plurality of moving communication nodes may include: a first set of moving communication nodes, the first set of moving communication nodes having membership in a first cohort of moving communication nodes, where the first cohort of moving communication nodes has a first specified motion pattern, and the plurality of moving communication nodes in the first cohort of moving communication nodes move in corresponding node motion directions according to the first specified motion pattern; and a second set of moving communication nodes, the second set of moving communication nodes having membership in a second cohort of moving communication nodes, where the second cohort of moving communication nodes has a second specified motion pattern, and the plurality of moving communication nodes in the second cohort of moving communication nodes move in corresponding node motion directions according to the second specified motion pattern; the initial node is selected by: determining that the node motion directions corresponding to the first specified motion pattern are preferable for routing the electronic data unit to the data unit geographic destination; and selecting one of the moving communication nodes in the first set of moving communication nodes as the initial node.

In some examples, the moving communication nodes in the first set of moving communication nodes may be operable to establish data communication with the moving communication nodes in the second set of moving communication nodes.

In some examples, the method may include routing the electronic data unit to the data unit geographic destination via a data unit route that includes the initial node and at least one subsequent node; and for each subsequent node of the at least one subsequent node, selecting that subsequent node by: identifying at least one potential subsequent node; determining, for each of the potential subsequent nodes, a subsequent node motion direction corresponding to a direction of motion of the potential subsequent node; and selecting the subsequent node from at least one potential subsequent node based on the subsequent node motion direction of the subsequent node.

In some examples, the selection of each subsequent node may be performed at the preceding node in the data unit route.

In some examples, the moving communication nodes in the first set of moving communication nodes may be unable to establish data communication with the moving communication nodes in the second set of moving communication nodes; and the method may include determining that the node motion directions corresponding to the first specified motion pattern are preferable by: determining that the first cohort of moving communication nodes provides a first data unit route to the data unit geographic destination; determining that the second cohort of moving communication nodes provides a second data unit route to the data unit geographic destination; and determining that the first data unit route is preferable to the second data unit route.

In some examples, the first data unit route may be determined to be preferable to the second data unit route in response to determining that the first data unit route has a lower delay than the second data unit route.

In some examples, each of the moving communication nodes in the plurality of moving communication nodes may be a satellite in orbit around the Earth.

In some examples, the plurality of moving communication nodes may be arranged into a satellite constellation in low earth orbit.

In some examples, the method may include determining a direction traffic load for each node motion direction; identifying a low-traffic direction based on the direction traffic load for each node motion direction; and selecting the initial node as a moving communication node corresponding to the low-traffic direction.

In some examples, the method may include identifying a plurality of potential initial nodes from the plurality of moving communication nodes based on the node motion direction for each potential initial node; determining operational characteristics of each potential initial node; and selecting the initial node as a particular potential initial node having preferred operational characteristics.

In some examples, the operational characteristics may include at least one of a node power dissipation level and/or a node energy storage level and/or a node CPU load.

In some examples, the method may include identifying a secure data unit route satisfying a set of geographic avoidance criteria for the electronic data unit, the set of geographic avoidance criteria specifying at least one geographic region required to be avoided by the communication link; and selecting the initial node as a moving communication node having a node motion direction capable of establishing the secure data unit route.

In some examples, each node motion direction may be determined by accessing a non-transitory storage memory storing movement patterns for the plurality of moving communication nodes.

In some examples, the method may include establishing data communication between the network element and each moving communication node in the plurality of moving communication nodes; and determining each node motion direction dynamically following establishment of the data communication for the corresponding moving communication node.

In accordance with this broad aspect, there is also provided a routing method implemented by a moving communication node, the method comprising: receiving an electronic data unit; determining, for each of a plurality of moving electronic communication nodes in wireless data communication with the satellite, a node motion direction corresponding to a direction of motion of the moving electronic communication node; selecting a node from the plurality of moving electronic communication nodes based on a data unit geographic destination for the electronic data unit and the node motion direction of the node; and transmitting the electronic data unit to the node In accordance with this broad aspect, there is also provided an apparatus comprising a processor; and a non-transitory computer readable storage medium storing processor executable instructions for execution by the processor, the processor executable instructions including instructions causing the apparatus to determine, for each of a plurality of moving electronic communication nodes in wireless data communication with the apparatus, a node motion direction corresponding to a direction of motion of the moving electronic communication node; select an initial node from the plurality of moving electronic communication nodes based on a data unit geographic destination for an electronic data unit and the node motion direction of the initial node; and transmit the electronic data unit to the initial node.

In some examples, the processor executable instructions may include instructions causing the apparatus to select the initial node by: identifying a desired node motion direction as the node motion direction that enables the electronic data unit to be routed between the apparatus and the data unit geographic destination using a least number of communication nodes.

In some examples, the plurality of moving communication nodes may include: a first set of moving communication nodes, the first set of moving communication nodes having membership in a first cohort of moving communication nodes, where the first cohort of moving communication nodes has a first specified motion pattern, and the plurality of moving communication nodes in the first cohort of moving communication nodes move in corresponding node motion directions according to the first specified motion pattern; and a second set of moving communication nodes, the second set of moving communication nodes having membership in a second cohort of moving communication nodes, where the second cohort of moving communication nodes has a second specified motion pattern, and the plurality of moving communication nodes in the second cohort of moving communication nodes move in corresponding node motion directions according to the second specified motion pattern; the processor executable instructions may include instructions causing the apparatus to select the initial node by: determining that the node motion directions corresponding to the first specified motion pattern are preferable for routing the electronic data unit to the data unit geographic destination; and selecting one of the moving communication nodes in the first set of moving communication nodes as the initial node.

In some examples, the moving communication nodes in the first set of moving communication nodes may be operable to establish data communication with the moving communication nodes in the second set of moving communication nodes.

In some examples, the processor executable instructions may include instructions causing the apparatus to route the electronic data unit to the data unit geographic destination via a data unit route that includes the initial node and at least one subsequent node; and for each subsequent node of the at least one subsequent node, that subsequent node is selected by: identifying at least one potential subsequent node; determining, for each of the potential subsequent nodes, a subsequent node motion direction corresponding to a direction of motion of the potential subsequent node; and selecting the subsequent node from at least one potential subsequent node based on the subsequent node motion direction of the subsequent node.

In some examples, the processor executable instructions may include instructions causing the apparatus to select each subsequent node in the data unit route.

In some examples, the moving communication nodes in the first set of moving communication nodes may be unable to establish data communication with the moving communication nodes in the second set of moving communication nodes; and the processor executable instructions may include instructions causing the apparatus to determine that the node motion directions corresponding to the first specified motion pattern are preferable by: determining that the first cohort of moving communication nodes provides a first data unit route to the data unit geographic destination; determining that the second cohort of moving communication nodes provides a second data unit route to the data unit geographic destination; and determining that the first data unit route is preferable to the second data unit route.

In some examples, the processor executable instructions may include instructions causing the apparatus to determine that the first data unit route is preferable to the second data unit route in response to determining that the first data unit route has a lower delay than the second data unit route.

In some examples, each of the moving communication nodes in the plurality of moving communication nodes may be a satellite in orbit around the Earth.

In some examples, the plurality of moving communication nodes may be arranged into a satellite constellation in low earth orbit.

In some examples, the processor executable instructions may include instructions causing the apparatus to: determine a direction traffic load for each node motion direction; identify a low-traffic direction based on the direction traffic load for each node motion direction; and select the initial node as a moving communication node corresponding to the low-traffic direction.

In some examples, the processor executable instructions may include instructions causing the apparatus to: identify a plurality of potential initial nodes from the plurality of moving communication nodes based on the node motion direction for each potential initial node; determine operational characteristics of each potential initial node; and select the initial node as a particular potential initial node having preferred operational characteristics.

In some examples, the operational characteristics may include at least one of a node power dissipation level and/or a node energy storage level and/or a node CPU load.

In some examples, the processor executable instructions may include instructions causing the apparatus to: identify a secure data unit route satisfying a set of geographic avoidance criteria for the electronic data unit, the set of geographic avoidance criteria specifying at least one geographic region required to be avoided by the communication link; and select the initial node as a moving communication node having a node motion direction capable of establishing the secure data unit route.

In some examples, the processor executable instructions may include instructions causing the apparatus to determine each node motion direction by accessing a non-transitory storage memory storing movement patterns for the plurality of moving communication nodes.

In some examples, the processor executable instructions may include instructions causing the apparatus to: establish data communication between the apparatus and each moving communication node in the plurality of moving communication nodes; and determine each node motion direction dynamically following establishment of the data communication for the corresponding moving communication node In some examples, an apparatus comprising a processor; and a non-transitory computer readable storage medium may store processor executable instructions for execution by the processor, the processor executable instructions including instructions causing the apparatus to perform a routing method as described herein.

According to other aspects of the disclosure, an apparatus including one or more components for implementing any of the method aspects as disclosed in this disclosure is provided. The term "components" is used broadly to refer to anything for implementing the above methods, and may alternately be known by various names, including for example, modules, units, elements, means, etc. The components can be implemented using hardware, software, firmware or any combination thereof.

It will be appreciated by a person skilled in the art that a device, method or computer program product disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

The drawings included herewith are for illustrating various examples of systems, methods, and devices of the teaching of the present specification and are not intended to limit the scope of what is taught in any way.

DESCRIPTION OF EXEMPLARY EMBODIMENTS

Figure 1:
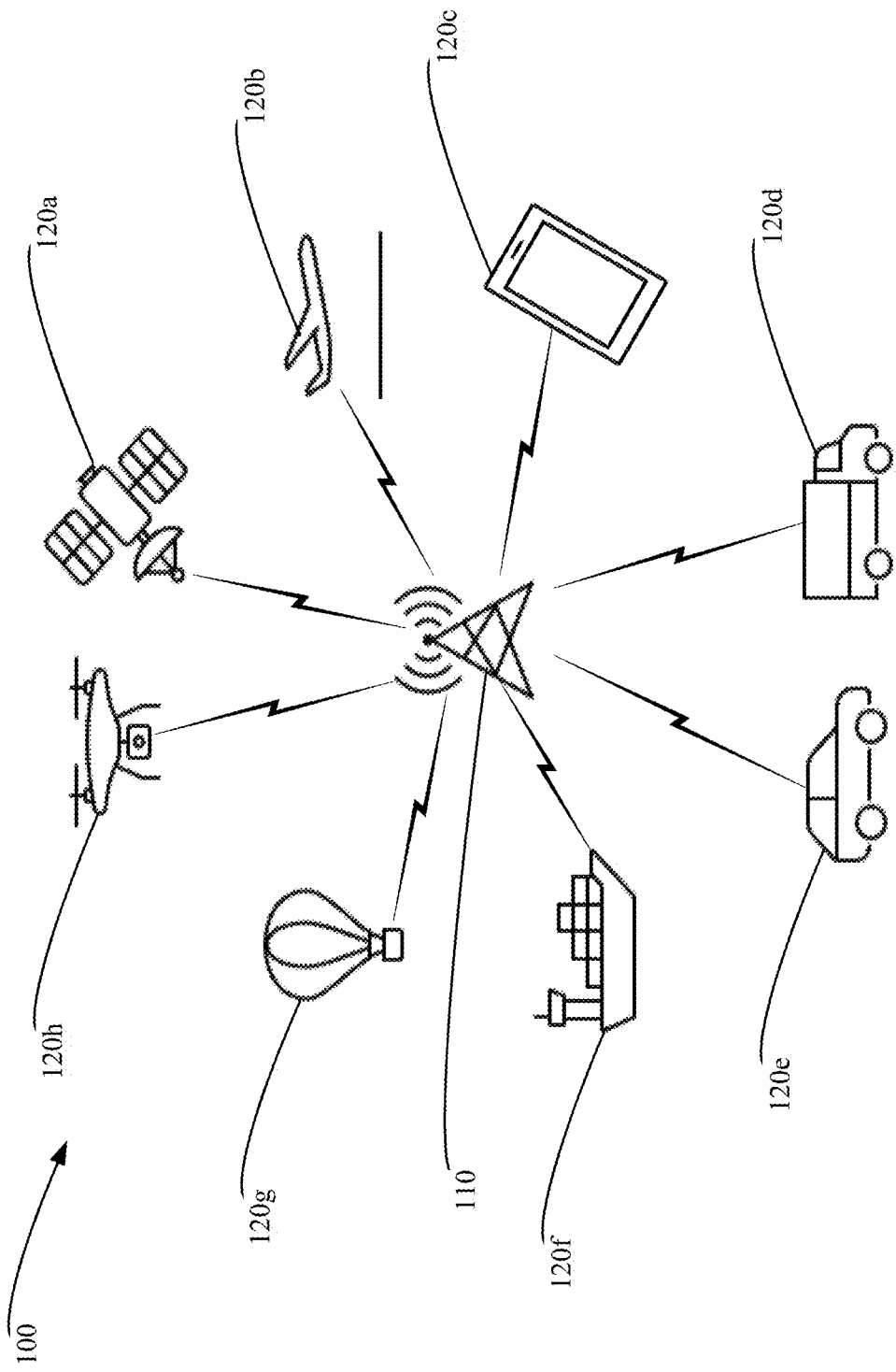
FIG. 1 is a diagram illustrating a simplified schematic of a communication system.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

A computer program is a group of instructions that can be executed by a computer (i.e. by a processor). A process is an instance of a program, i.e. a copy of a program in computer memory that is ready to be executed by the computer's central processing unit(s) (CPUs). In the discussion that follows, reference is made to a processor of a computer system and operations performed by the processor of a computer system. It should be understood that such references encompass one or more processing elements and the use of one or more processing elements to perform operations, such as one or more processing cores within one or more CPUs.

Referring now to FIG. 1, shown therein is an example communication system 100. The example communication system 100 illustrates an example of a network element 110 and a plurality of communication nodes 120a-120h (referred to collectively as communication nodes 120).

In embodiments described herein, the network element 110 may be configured to establish concurrent data communication links with multiple communication nodes 120. When transmitting data, the network element 110 may evaluate the nodes 120 attached to the network element 110 (i.e. those nodes 120 with which the network element 110 has established a data communication link) according to one or more criteria. The network element 110 may select a particular node 120 to which the data is transmitted based on the evaluation of each node 120 according to the criteria. The particular node 120 may be selected as the node that best satisfies a particular criterion or set of criteria.

The communication nodes 120 illustrated in system 100 are examples of moving communication nodes that may be used as nodes in wireless communication systems. The communication nodes 120 can operate as intermediate nodes usable to route data units from a transmitting network element to a destination device. The data units may be transmitted between a first end point device (also referred to as a source device) connected (directly or indirectly) to the transmitting network element and a second end point device (also referred to as the destination device) via the communication nodes 120. Each device in the data route (as well as the devices evaluated for inclusion in the data route) has an associate device address, including a source address associated with the source device, a destination address associated with the destination device, a network element address associated with network element 110, and a node address associated with each corresponding communication node 120.

As illustrated, a communication system 100 may include moving communication nodes 120 in various forms, such as satellites 120a, airplanes 120b, mobile devices 120c, trucks 120d, cars 120e, seafaring vessels 120f, balloons 120g, drones 120h and other moving communication nodes such as autonomous vehicles and/or portable mobile base stations for example. It should be understood that the communication nodes 120 may also be considered network elements within one or more communication networks.

In networks using moving communication nodes 120, the nodes of the communication network are themselves mobile and their movement might spread across a large geographical area. The mobile nature of the communication nodes 120 may result in networks or portions of networks having hyper dynamic topology where peer adjacencies (and as a result the network topology) are in constant churn. This further complicates data routing and may require careful selection of the communication nodes used to transmit data units (e.g. data frames and/or data packets).

In some examples, the moving communication nodes 120 may be coupled to corresponding cohorts of moving communication nodes (also referred to herein as node network portions). These node cohorts may operate according to pre-defined motion patterns. The pre-defined motion patterns may specify the pattern of motion of the individual nodes within the node cohort. This may allow a network element 110 to determine a data route that can be established through the corresponding node cohort that is connected to a particular moving communication node. In some cases, the cohort of moving communication nodes corresponding to a particular node 120 may be the set of moving communication nodes to which that particular node is capable of transmitting data within a specified number of hops or links between nodes.

For example, the moving communication node 120a may be coupled to a corresponding ascending or descending cohort of a satellite constellation (subset of the constellation currently executing an ascending or descending pass, respectively). A satellite constellation can include a plurality of satellites 120a that orbit the Earth according to a pre-defined motion pattern (see e.g. FIG. 3 described herein below) which includes ascending passes as each satellite moves northward toward its maximum latitude and descending passes as each satellite moves southward toward its minimum latitude. This may allow the network element to determine a potential data routing path that can be accessed via the satellite 120a (either dynamically through communication with satellite 120a and/or through the use of a database storing the predefined motion pattern of the constellation).

In some examples, the potential data routing path may refer to the entire data routing path from the network element 110 to the data unit geographic destination. For example, the network element 110 may store an almanac in non-transitory storage memory that identifies the potential communication nodes for the entire routing path. Alternately, the potential data routing path may refer to only to a subset of the entire data routing path (e.g. the portion of the entire data routing path the network element 110 is able to identify). For example, the network element 110 may omit an almanac and/or the data stored by the network element 110 may not identify all of the communication nodes 120 in the entire routing path.

In some examples, the moving communication nodes 120 may be coupled to node network portions that do not have a pre-defined motion pattern. Such node network portions may include connections between nodes 120 that are established in a more ad-hoc fashion. For example, communication networks using drones 120h, balloons 120g or other similar moving communication nodes may include inter-node data links that are established on an ad hoc basis depending on the location of the nodes at any given time. Similarly, communication networks that allow for data transmission between heterogeneous nodes 120 may include a subset of nodes that move according to pre-defined motion patterns as well as a subset of nodes that do not move according to a pre-defined pattern. Accordingly, the cohort of moving communication nodes corresponding to a particular node 120 may vary for the particular node.

In such cases, it may not be possible for the network element 110 to determine the precise data route available through a node 120 in advance. As a result, a network element may be limited to selecting the initial node based on data relating to the moving communication nodes directly connected to that network element or a subset of nodes accessible through the moving communication nodes directly connected to that network element.

For example, the network element 110 may only be capable of determining the network topology of the nodes 120 within a region nearby to that network element 110. The network element 110 may select the initial node based on the network topology data available to that network element 110 (e.g. data corresponding to a portion of a communication network nearby to that network element 110). In some cases, the network element 110 may only have information relating to nodes visible to that network element and no additional information regarding the overall topology of the moving communication nodes and/or node cohorts. In such cases, the network element 110 may simply select an initial node based on information relating to the potential initial nodes coupled to the network element 110 (i.e. by selecting the best initial node according to one or more selection criteria without evaluating of information relating to any potential subsequent nodes and/or node cohorts attached thereto). In some such cases, the moving communication nodes 120 may then perform the selection of the subsequent node using one or more selection criteria.

Figure 2:
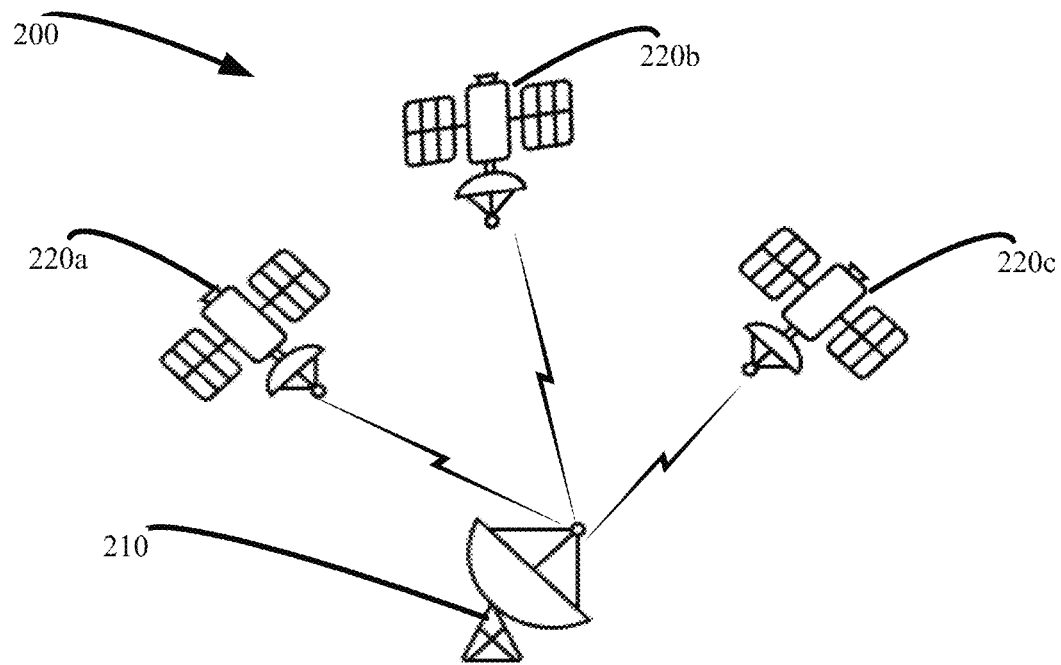
FIG. 2 is a diagram illustrating a simplified schematic of a communication system including a network element and a plurality of communication nodes.

Referring now to FIG. 2, shown therein is an example communication system 200. Communication system 200 is an illustrative example of a communication system (such as communication system 100) in which a network element 210 is coupled to a plurality of moving communication nodes 220a-220c (referred to collectively as nodes 220) in the form of satellites.

In general, the communication system 200 enables multiple wireless or wired elements to communicate data and other content. The purpose of the communication system 200 may be to provide content, such as voice, data, video, and/or text, via broadcast, multicast and unicast, etc. The communication system 200 may operate by sharing resources, such as carrier spectrum bandwidth, between its constituent elements. The communication system 200 may include a terrestrial communication system (e.g. a network element 210 in the form of a terrestrial base station or nodes such as terrestrial vehicles or mobile electronic devices) and/or a non-terrestrial communication system (e.g. communication nodes 220 in the form of satellites, drones or other non-terrestrial elements). The communication system 200 may provide a wide range of communication services and applications (such as earth monitoring, remote sensing, passive sensing and positioning, navigation and tracking, autonomous delivery and mobility, etc.). The communication system 200 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

In communication systems using moving communication nodes, a network element 210 may have simultaneous connectivity to multiple moving communication nodes 220. Simultaneous connectivity may be particularly prevalent in dense node networks where there is a large number of moving communication nodes. In cases of simultaneous connectivity, the selection of the initial moving communication node can play an important role in delivering traffic flows to various geographic destinations. Accordingly, proper selection of the initial node may improve the throughput and stability of the communication system 200 as a whole (while also ensuring effective delivery of the data unit(s) being transmitted).

For example, a network element 210 in the form of a ground station may be capable of establishing simultaneous connectivity to multiple moving communication nodes 220. These moving communication nodes may be coupled to one or more aerial node networks (particularly in locations with dense aerial networks). The aerial network(s) may be configured to employ a geographical routing mechanism such as Orthodromic Routing or Piece-wise shortest path first (PWSPF) Routing for data unit routing and forwarding purposes. The selection of the initial node 220 for data transmission can substantially impact the flow of data through the aerial network and the transmission delay for the data unit to reach its destination.

To select the initial node, the network element 210 can apply one or more selection criteria. The network element 210 may determine the geographical destination address for a given data unit (e.g. the network element 210 may identify the geographical destination address from a data packet to be transmitted). The network element 210 can also determine various operational characteristics and motion data relating to the moving communication nodes 220 (and associated node cohorts) that are in data communication with the network element 210. The network element 210 can evaluate the moving communication nodes 220 using the operational characteristics and/or motion data according to the defined selection criteria.

For example, the network element 210 may determine node specific operational characteristics such as operational characteristics relating to a particular node 220, and/or node cohort operational characteristics such as operational characteristics relating to a node cohort corresponding to the particular node 220 and/or link operational characteristics relating to the operational characteristics of the data link between the network element 210 and one or more nodes 220.

Examples of node specific operational characteristics may include a node traffic load, a node power dissipation level, a node energy storage level, a node CPU load level, a node I/O buffer level, a node link time period (e.g. the time period that the node will remain in range of the network element), expected future links (e.g. communication nodes expected to be in range next and the time they each of those nodes stay in range) and so on. Examples of node cohort operational characteristics may include a cohort traffic load, a cohort power dissipation level, a cohort energy storage level, a cohort CPU load level and so on. Examples of link operational characteristics may include data link communication characteristics, a link traffic load, a link directional traffic load (e.g. the traffic load on the uplink and/or downlink direction), a link data capacity and so on.

The network element 210 may also determine node-specific motion data relating to the particular node 220 and/or node cohort motion data relating to the node cohort corresponding to the particular node 220.

In some examples, the network element 210 may determine certain operational characteristics and/or motion directions (such as a node's motion direction and/or time in range for example) based on stored data (e.g. an almanac stored by the network element). Alternately or in addition, the network element 210 may determine certain operational characteristics and/or motion directions (such as a node's power level and/or traffic load and/or CPU load for example) dynamically upon establishing a communication link with a given node.

Based on the operational characteristics and/or motion data, the network element 210 can evaluate the plurality of moving communication nodes according to one or more selection criteria. Examples of selection criteria can include minimizing transmission delay (e.g. based on node motion direction and/or CPU load and/or data traffic load), data traffic load balancing and/or protection (for a given node and/or a given node cohort), energy conservation (for a given node and/or a given node cohort), traffic based link management (e.g. separation of uplink data flow and downlink data flow). Example processes for selecting an initial node are described in further detail herein below with reference to FIGS. 5-7.

In the example of communication system 200, each of the moving communication nodes 220 (in communication with network element 210) is a satellite in orbit around the Earth. Alternately or in addition, the moving communication nodes may include nodes connected to node cohorts consisting of movable ground equipment (e.g. movable ground base stations such as cars with base stations etc.), and/or other movable aerial nodes (e.g. drones, balloons), and/or other movable nodes such as seafaring vessels.

Satellites 220 in communication with a network element 210 may be arranged into a network of satellites (e.g. a low earth orbit (LEO) satellite constellation). The network of satellites may be arranged in various ways, including multiple shell satellite constellations (including shells with different altitudes) and/or multiple satellite constellations. An example arrangement of moving communication nodes arranged into a satellite constellation is illustrated in communication system 300a shown in FIG. 3A.

Figure 3A:
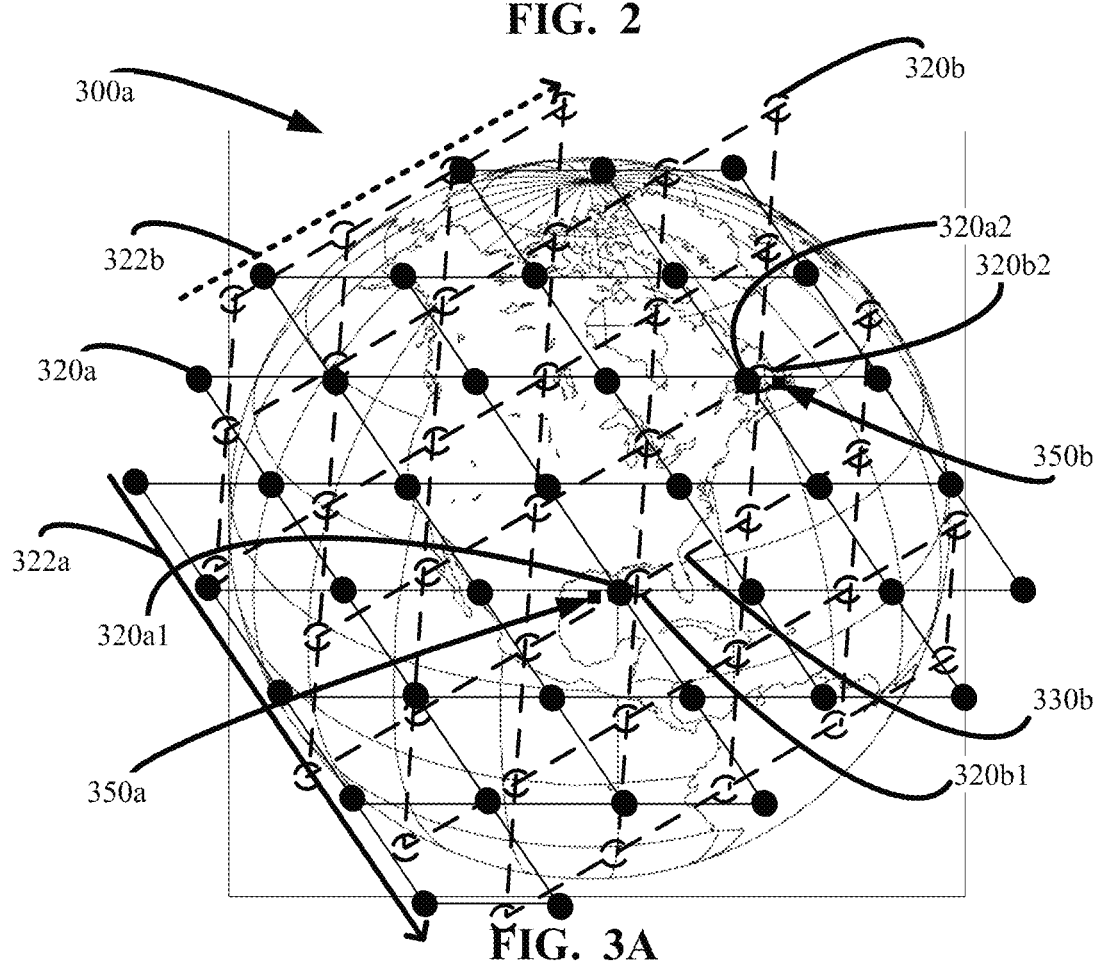
FIG. 3A is a diagram illustrating a simplified schematic illustrating an arrangement of communication nodes that may be used with the communication systems of FIGS. 1 and 2.

Referring now to FIG. 3A, shown therein is an example of a communication system 300a including sets 320a and 320b of moving communication nodes (collectively referred to as nodes 320) associated with a plurality of communication network portions which will be referred to as cohorts.

As shown in the example of FIG. 3A, the communication system 300a includes a first set of moving communication nodes 320a and a second set of moving communication nodes 320b. The first set of moving communication nodes 320a are connected in a first cohort of moving communication nodes. The first cohort of moving communication nodes 320a has a first specified motion pattern. The plurality of moving communication nodes 320a in the first cohort of moving communication nodes move in corresponding node motion directions according to the first specified motion pattern.

As illustrated, the second set of moving communication nodes 320b are connected in a second cohort of moving communication nodes. The second cohort of moving communication nodes 320b has a second specified motion pattern. The plurality of moving communication nodes 320b in the second cohort of moving communication nodes move in corresponding node motion directions according to the second specified motion pattern. In the example illustrated, the second specified motion pattern is different from the first specified motion pattern.

The example communication system 300 shown in FIG. 3A includes moving communication nodes 320 in the form of satellites. The satellites are arranged into a satellite constellations in low earth orbit.

In the example illustrated, the satellites are arranged into a simplified example of a Walker-Delta constellation. However, various other types of satellite arrangements, including other types of constellations and multi-shell constellations may be used with embodiments of the present disclosure.

A Walker-Delta constellation is an arrangement of satellites in which all orbits share a common inclination such that the orbits are neither polar nor equatorial. The inclination angle is equal to the maximum absolute value latitude each satellite reaches during its ascension and descension, also equal to the angle the orbital plane makes with the equatorial plane. No coverage is available north and south of these maximum and minimum latitudes. The orbits are distributed evenly around the globe, with their ascension nodes (points of equatorial crossing) a degrees apart where $a=360/N_{orbits}$. Within each orbit there are a number M satellites per orbit evenly distributed following the same ground track. Every satellite is launched in an initial direction, but each orbit has an ascending portion during which it crosses the equator northward and a descending portion during which it crosses the equator southward. Thus, there will always be one cohort, approximately $MN_{orbits}/2$ satellites, moving northward at any given time, and one cohort moving southward.

In a Walker-Delta constellation for satellite networking, a satellite maintains communication links (Intersatellite links, or ISL) with its adjacent neighbors. Neighbors may be adjacent by virtue of being the next or previous satellite in a common orbit. Links between such neighbors may be referred to as intraorbital ISLs. Neighbors may also be adjacent if they orbit with their latitude function in phase with one another but in orbits with neighboring equatorial crossings. Though the orbits are not truly parallel and cross one another twice per orbit, they may be colloquially referred to as "parallel orbits." Links between such neighbors may be referred to as interorbital ISLs.

Intraorbital links are the most stable and require the least beam steering to maintain. Intraorbital neighbors, particularly in circular orbits, maintain virtually the same separation and attitude from one another throughout the orbital mission time. Maintaining this link requires tiny adjustments in beam steering due to atmospheric drag-induced orbital perturbations. The link is essentially always-on unless a hardware failure disables it.

Interorbital links have a high degree of uptime with periodic outages. During the ascending and descending portion of the orbits, the neighbors move in pseudoparallel fashion, with their link's separation and required beam steering angle varying slowly and predictably according to known orbital motion. As the satellites approach the extremes of latitude, the separation closes rapidly and the orbits cross. The link shuts down as the required beam steering angle exceeds each transceiver's maximum steering ability. After one interorbital neighbor leaves beam steering range, the opposite interorbital neighbor crosses into beam steering range, and a new interorbital ISL is established which will last another half orbit. While more challenging than the intraorbital ISL, this kind of link is one of the four main reliable links present in a Walker-Delta satellite network.

It is possible, though far more challenging in terms of high speed beam tracking and Doppler compensation, to establish a $5^{th}$ link with a nearby satellite in the opposite cohort. This satellite may be in communication range for only a few minutes and closing at a rapid velocity with a rapidly changing heading, then retreating again at high velocity. However, with sufficiently precise real-time beam steering and frequency compensation for the Doppler effect of the satellite closing and retreating at high speeds, a data link may be established. Data units may be passed from one cohort to another to provide another choice of motion direction for a subsequent node associated with another network distance and set of operating characteristics which may be the most suitable for routing a data unit.

In example configuration shown in FIG. 3A, the first specified motion pattern involves the first cohort (the descending cohort in the example illustrated) of moving communication nodes 320a being configured to move in a south-east direction 322a for the illustrated portion of their orbit around the Earth. At the same time, the second specified motion pattern involves the second cohort (the ascending cohort in the example illustrated) of moving communication nodes 320b being configured to move in a north-east direction 322b for the illustrated portion of their orbit around the Earth.

In context of the example illustrated in FIG. 3A, the first specified motion pattern and the second specified motion pattern may be similar in the sense that the first cohort and second cohort may ultimately traverse a similar path in orbit around Earth. However, in this example the first specified motion pattern and the second specified motion pattern differ in that the time period during which the nodes in the first cohort traverse a particular portion of the orbital path is different from the time period during which the nodes in the second cohort may traverse that particular portion of the orbital path. In terms of the selection of an initial node for a data transmission, the specified motion pattern being considered generally refers to the pattern of motion that the nodes will undergo during a time period relevant to the data transmission (e.g. the time period required for the data transmission to pass through the nodes and corresponding nodes in the respective cohorts).

In some examples, the moving communication nodes 320a in the first set of moving communication nodes may be operable to establish data communication with the moving communication nodes 320b in the second set of moving communication nodes. In the context of a Walker-Delta satellite constellation, this may be referred to as including a $5^{th}$ inter-satellite link (with the first four inter-satellite links referring to the links between a given satellite and the four adjacent satellites within the same cohort of satellites). This may increase the available data route paths between a network element and a destination address, although the complexity of establishing the $5^{th}$ link and determining an optimal routing path may be increased.

Alternately, the moving communication nodes 320a in the descending cohort may omit links to the moving communication nodes 320b in the ascending cohort (i.e. there is no $5^{th}$ link). In such cases, the moving communication nodes 320a in the first set of moving communication nodes may be unable to establish data communication with the moving communication nodes 320b in the second set of moving communication nodes.

Figure 4:
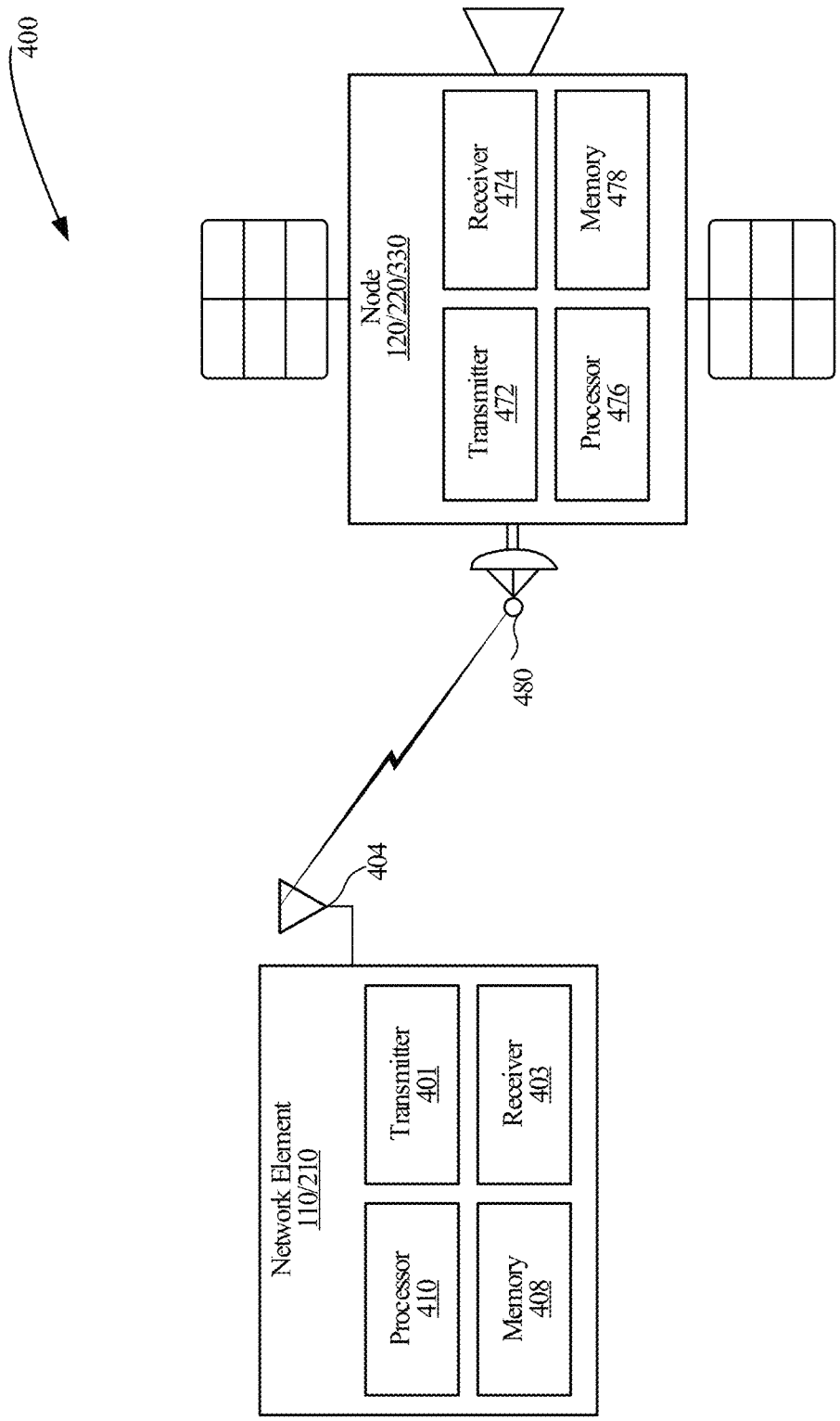
FIG. 4 is a block diagram illustrating an example of components that may be implemented in network elements and communication nodes that may be used in the communication systems of FIGS. 1 and 2.

Referring now to FIG. 4, shown therein an example communication system 400 illustrating components of an example network element 110/210 (referred to collectively as network element 110) and an example communication node 120/220/320 (referred to collectively as node 120).

The network element 110 includes a transmitter 401 and a receiver 403 coupled to one or more antennas 404. Only one antenna 404 is illustrated. One, some, or all of the antennas may alternatively be panels. The transmitter 401 and the receiver 403 may be integrated, e.g. as a transceiver. The transceiver is configured to modulate data or other content for transmission by at least one antenna 404 or network interface controller (NIC). The transceiver is also configured to demodulate data or other content received by the at least one antenna 404. Each transceiver includes any suitable structure for generating signals for wireless or wired transmission and/or processing signals received wirelessly or by wire. Each antenna 404 includes any suitable structure for transmitting and/or receiving wireless or wired signals.

The network element 110 includes at least one memory 408. Memory 408 can be used to store information and data. The memory 408 stores instructions and data used, generated, or collected by the network element 110. For example, the memory 408 could store software instructions or modules configured to implement some or all of the functionality and/or embodiments described herein and that are executed by the processing unit(s) 410. Each memory 408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The network element 110 may further include one or more input/output devices (not shown) or interfaces (such as a wired interface to the internet). The input/output devices permit interaction with a user or other devices in the network. Each input/output device includes any suitable structure for providing information to or receiving information from a user, such as a speaker, microphone, keypad, keyboard, display, or touch screen, including network interface communications.

The network element 110 further includes a processor 410 for performing operations including those related to preparing a transmission for transmission to the node 120, those related to processing transmissions received from the node 120, and those related to processing transmissions to and from another network element 110. Processing operations related to preparing a transmission for transmission may include operations such as encoding, modulating, transmit beamforming, and generating symbols for transmission. Processing operations related to processing transmissions may include operations such as receive beamforming, demodulating and decoding received symbols. Depending upon the embodiment, a transmission may be received by the receiver 403, possibly using receive beamforming, and the processor 410 may extract signaling from the downlink transmission (e.g. by detecting and/or decoding the signaling). In some embodiments, the processor 410 implements the transmit beamforming and/or receive beamforming based on the indication of beam direction, e.g. beam angle information (BAI), received from node 120. In some embodiments, the processor 410 may perform operations relating to network access (e.g. initial access) and/or downlink synchronization, such as operations relating to detecting a synchronization sequence, decoding and obtaining the system information, etc. In some embodiments, the processor 410 may perform channel estimation, e.g. using a reference signal received from the node 120. Processing operations related to preparing a transmission for transmission may include operations such as encoding, modulating, precoding (e.g. MIMO precoding), transmit beamforming, and generating symbols for transmission. Processing operations related to processing received transmissions may include operations such as receive beamforming, and demodulating and decoding received symbols. The processor 410 may also perform operations relating to network access (e.g. initial access) and/or data link synchronization, such as generating the content of synchronization signal blocks (SSBs), generating the system information, etc. In some embodiments, the processor 460 may generate signaling, e.g. to configure one or more parameters of the node 120. Any signaling generated by the processor 410 is sent by the transmitter 401.

Although not illustrated, the processor 410 may form part of the transmitter 401 and/or receiver 403. Although not illustrated, the memory 408 may form part of the processor 410.

The processor 410, and the processing components of the transmitter 401 and receiver 403 may each be implemented by the same or different one or more processors that are configured to execute instructions stored in a memory (e.g. in memory 408). Alternatively, some or all of the processor 410, and the processing components of the transmitter 401 and receiver 403 may be implemented using dedicated circuitry, such as a programmed field-programmable gate array (FPGA), a graphical processing unit (GPU), or an application-specific integrated circuit (ASIC).

Each network element 110 represents any suitable device for wireless operation and may include such devices (or may be referred to) as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. A network element 110 may also represent devices such as user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation network elements 110 may be referred to using other terms.

In some examples, network element 110 may be a device at a fixed location, such as a fixed terrestrial base station. Alternately, network element 110 may be a movable device, similar to communication nodes 120.

In some embodiments, the parts of the network element 110 may be distributed. For example, some of the modules of the network element 110 may be located remote from the equipment housing the antennas of the network element 110, and may be coupled to the equipment housing the antennas over a communication link (not shown) sometimes known as front haul, such as common public radio interface (CPRI).

Although the moving communication node 120 is illustrated as a satellite only as an example, the node 120 may be implemented in any suitable mobile form include terrestrial and non-terrestrial forms. The node 120 includes a transmitter 472 and a receiver 474 coupled to one or more antennas 480. Only one antenna 480 is illustrated. One, some, or all of the antennas may alternatively be panels. The transmitter 472 and the receiver 474 may be integrated as a transceiver. The node 120 further includes a processor 476 for performing operations including those related to: preparing a transmission for transmission to the network element 110, processing a transmission received from the network element 110. Processing operations related to preparing a transmission may include operations such as encoding, modulating, precoding (e.g. MIMO precoding), transmit beamforming, and generating symbols for transmission. Processing operations related to processing received transmissions may include operations such as receive beamforming, and demodulating and decoding received symbols. In some embodiments, the processor 476 implements the transmit beamforming and/or receive beamforming based on beam direction information (e.g. BAI) received from network element 110. In some embodiments, the node 120 implements physical layer processing, but does not implement higher layer functions such as functions at the medium access control (MAC) or radio link control (RLC) layer. As this is only an example, more generally, the node 120 may implement higher layer functions in addition to physical layer processing.

The node 120 further includes a memory 478 for storing information and data. Although not illustrated, the processor 476 may form part of the transmitter 472 and/or receiver 474. Although not illustrated, the memory 478 may form part of the processor 476.

The processor 476 and the processing components of the transmitter 472 and receiver 474 may each be implemented by the same or different one or more processors that are configured to execute instructions stored in a memory, e.g. in memory 478. Alternatively, some or all of the processor 476 and the processing components of the transmitter 472 and receiver 474 may be implemented using dedicated circuitry, such as a programmed FPGA, a GPU, or an ASIC. In some embodiments, the node 120 may actually be a plurality of nodes that are operating together.

The network element 110 and node 120 may include other components, but these have been omitted for the sake of clarity.

One or more steps of the embodiment methods provided herein may be performed by corresponding units or modules in a device, such as in network element 110, or in node 120. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Figure 5:
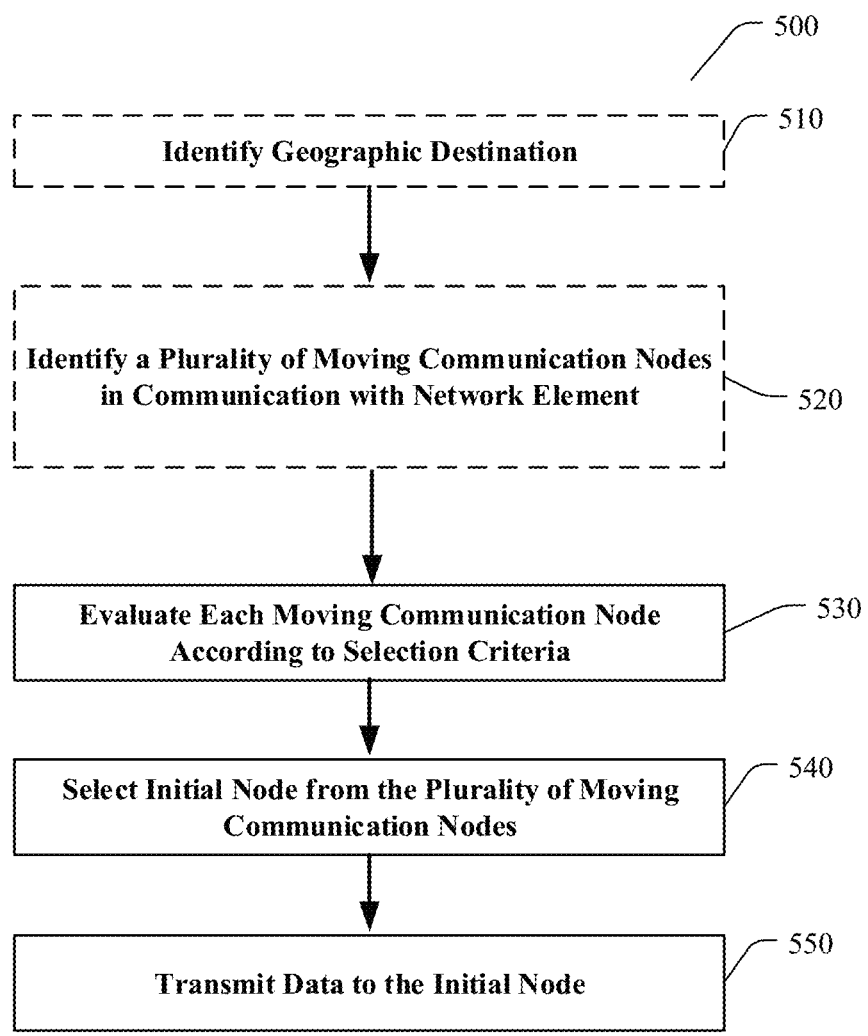
FIG. 5 is a flowchart illustrating an example process for routing data to a geographic destination via an initial node.

Referring now to FIG. 5, shown therein is an example routing process 500 that may be implemented by a network element such as network elements 110/210 described herein above. The routing process 500 may be used by the network element to identify and select an initial communication node for data transmission. The initial communication node may be selected in order to route a data unit from the network element to a geographic data unit destination via the initial node. As described below in relation to FIG. 8, a similar process may be performed by a moving communication node to select a subsequent node to route the data unit to the geographic data unit destination.

Optionally, at 510 the network element can identify a data unit geographic destination for a data unit. The data unit geographic destination can be determined based on a destination address associated with the data unit. For example, the network element may determine the data unit geographic destination from the data unit itself (e.g. the destination address associated with a data packet).

The data unit may be configured in various ways, depending on the communication protocol used and/or the communication layer for that data unit. For example, the data unit may be a data packet or a data frame or other type of data unit that may be transmitted wirelessly between communication devices. In some examples, the data unit may be a portion or fragment of a data packet and/or data frame. There may be various reasons why a network element 110 may transmit data in fragments, such as limited connectivity time to a given node 120, a limited maximum transmission unit (MTU), and so forth. Accordingly, the network element 110 may fragment a given data packet or frame or other complete data unit into fragmented data units that can be transmitted to a node 120.

Optionally, at 520 the network element can identify a plurality of moving communication nodes in data communication with the network element. The plurality of moving communication nodes in data communication with the network element can be identified to include moving communication nodes having establishing data links with the network element (also referred to as moving communication nodes attached to the network element). The moving communication nodes can include a variety of different communication devices, such as the example moving communication nodes 120/220/320 described herein above. The network element may identify the moving communication nodes as nodes within sufficient range of that network element to enable data transmission therebetween (at least for the time period required for the data transmission).

At 530, the network element can evaluate a plurality of moving communication nodes in data communication with the network element. As noted above, the plurality of moving communication nodes may be identified at 520. The evaluation of the moving communication nodes at 530 can be used to determine which of the moving communication nodes is preferred according to specified selection criteria for the network element.

Various types of selection criteria may be used by the network element to evaluate the plurality of moving communication nodes. Evaluating the selection criteria may require the network element to analyze the motion direction and/or operational characteristics associated with particular nodes and/or node cohorts and/or and node links.

For example, the selection criteria may be defined to minimize a transmission delay from the network element to a data unit geographic destination (e.g. a data unit geographic destination that may be identified at 510). This may require the network element to evaluate the node motion direction of the plurality of moving communication nodes. This may also require the network element to evaluate operational characteristics of the plurality of moving communication nodes (or associated node cohort), such as CPU load, data traffic load and the like.

Alternately or in addition, the selection criteria may be defined to minimize a transmission distance from the network element to the data unit geographic destination. This may require the network element to evaluate the node motion direction of the plurality of moving communication nodes for example.

Alternately or in addition, selection criteria may be defined to balance and/or protect the data traffic load through a given node and/or a given node cohort. This may require the network element to evaluate operational characteristics of the plurality of moving communication nodes (or associated node cohort), such as data traffic load for example.

Alternately or in addition, selection criteria may be defined to conserve energy for a given node and/or a given node cohort. This may require the network element to evaluate operational characteristics of the plurality of moving communication nodes (or associated node cohort), such as node power dissipation level and/or node energy storage level for example.

Alternately or in addition, selection criteria may be defined to provide traffic based link management (e.g. separating uplink data flow and downlink data flow by selecting different initial communication nodes for uplink data flow and downlink data flow and/or selecting different links to the same initial node for uplink data flow and downlink data flow where the initial node has multiple communication links to the network element). This may require the network element to evaluate link operational characteristics of the plurality of moving communication nodes.

In some examples, the motion direction of the plurality of moving communication nodes may be evaluated based on the selection criteria. For example, the motion direction of the plurality of moving communication nodes may be evaluated in order to select an initial node likely to minimize a transmission distance and/or delay.

In such examples, the network element can determine, for each of the plurality of moving communication nodes, a node motion direction corresponding to a direction of motion of the moving communication node. An example of a process 600 for evaluating each moving communication node according to a node motion direction selection criteria is described herein below with reference to FIG. 6.

In some examples, operational characteristics of the plurality of moving communication nodes may be used as selection criteria. In some examples, the operational characteristic(s) may be evaluated based on the individual communication nodes in data communication with the network element. Alternately or in addition, the operational characteristic(s) may be evaluated based on a node cohort to which each moving communication node is connected. An example of a process 700 for evaluating each moving communication node according to an operational characteristic selection criteria is described herein below with reference to FIG. 7.

In some examples, the selection criteria applied at 530 may include a set of geographic avoidance criteria. The geographic avoidance criteria may specify a geographic region or regions that is to be avoided during routing of the data unit. The geographic avoidance criteria may be defined based on data security requirements for the data unit. For example, the geographic region or regions may be identified based on regions where unauthorized data access (e.g. interceptions of communications) may be expected and/or of particular concern.

In some examples, the geographic avoidance criteria may be specified for an individual data unit and/or a set of data units. Alternately or in addition, a geographic avoidance criteria may be specified for all data units by default (e.g. for all data units transmitted by that network element).

The network element may then evaluate the plurality of moving communication nodes to identify a secure data unit route satisfying the geographic avoidance criteria for the data unit. For example, the network element may determine that one or more moving communication nodes are coupled to node cohorts capable of routing the data unit to the geographic destination along a secure data unit route that avoids the geographic region(s) of concern. In some cases, the geographic avoidance criteria may also be applied to the selection of subsequent nodes. A moving communication node receiving a data unit can use the motion direction of potential subsequent nodes to determine a more secure path using the geographic avoidance criteria. For example, the network element may define an avoidance routing parameter in the header data associated with the data unit. The avoidance routing parameter may specify that the selection of subsequent nodes is also restricted to nodes that satisfy the geographic avoidance criteria.

At 540, the network element can select an initial node from the plurality of moving communication nodes. The network element may select the initial node based on the evaluation of the plurality of moving communication nodes conducted at 530. The network element may select the initial node as the moving communication node that best satisfies the selection criteria evaluated at 530.

In some examples, where the selection criteria relate to the node motion direction of the moving communication nodes, the network element may select the initial node based on the data unit geographic destination and the node motion direction of the moving communication nodes.

In some examples, where the selection criteria include a set of geographic avoidance criteria, the network element may select the initial node as a moving communication node having a node motion direction capable of establishing the secure data unit route.

In some examples, the network element may evaluate the plurality of moving communication nodes using a plurality of selection criteria. In such cases, the network element may identify one or more moving communication nodes capable of satisfying all the selection criteria. The initial node may then be selected from the one or more moving communication nodes identified.

In some examples, the network element may define a hierarchy of selection criteria to be evaluated at 530. The hierarchy of selection criteria can be used to identify the preferred moving communication node for selection as the initial node. For example, the hierarchy of selection criteria may define a relative importance of multiple selection criteria that may be used to evaluate the moving communication nodes.

For example, the network element may apply an initial selection criteria (for instance, a delay minimization selection criteria) to the plurality of moving communication nodes. If multiple moving communication nodes satisfy the initial selection criteria evenly, then a subsequent selection criteria (e.g. a data traffic load balancing criteria) may be applied to select the initial node from the communication nodes that satisfy the initial selection criteria evenly. The network element may repeat this process using further selection criteria until a single, preferred initial node is identified.

In some examples, the selection criteria may define minimum threshold requirements for one or more operational characteristics and/or motion directions. Examples of threshold requirements may include a minimum level of required power, a minimum level of available CPU load, a minimum remaining time in range and so forth. The network element may identify one or more moving communication nodes (e.g. from the nodes identified at 510) that satisfy the threshold requirements as being potential initial nodes. The network element may then select the initial node from these potential initial nodes, e.g. by applying selection criteria and/or a hierarchy of selection criteria.

At 550, the network element can transmit the data unit to the initial node selected at 540. The data unit may be routed to the data unit geographic destination via the initial node.

In some examples, the data unit may be routed to the data unit geographic destination via the initial node and at least one subsequent node. In some cases, the at least one subsequent node may effectively be specified by the selection of the initial node (e.g. where the initial node is part of a communication network having a limited number of routing options available to reach the data unit geographic destination and/or where the network element sets one or more routing bits associated with the data unit). Alternately, the at least one subsequent node may be determined dynamically as part of the process for routing the data unit to the data unit geographic destination. An example of a process 800 for selecting a subsequent node is described herein below with reference to FIG. 8.

Figure 6:
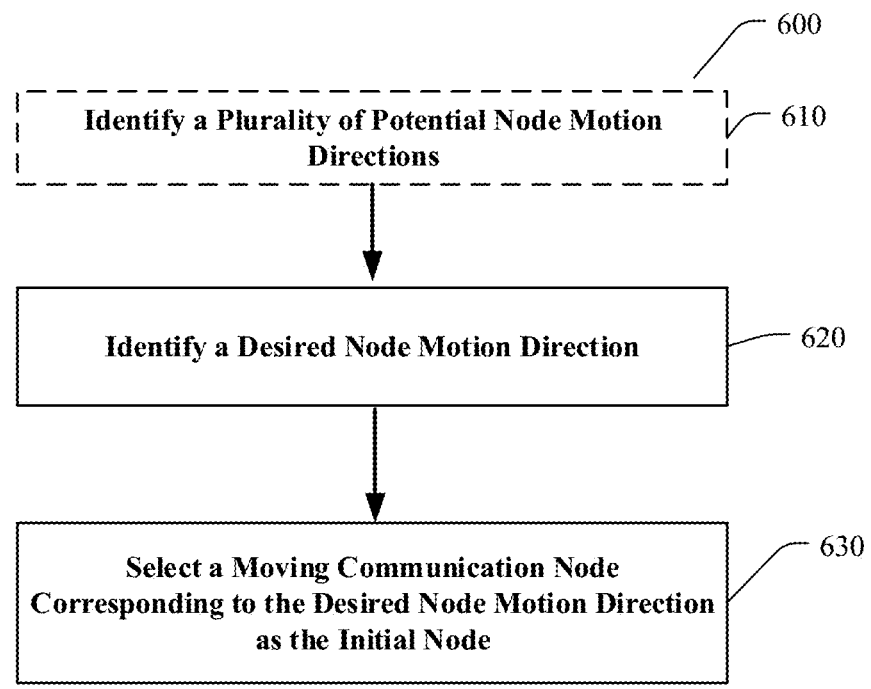
FIG. 6 is a flowchart illustrating an example process for selecting the initial node that may be used by the example process shown in FIG. 5.

Referring now to FIG. 6, shown therein is an example process 600 for evaluating moving communication nodes according to a node motion direction selection criteria. Process 600 is an example process that may be used at steps 530 and 540 of process 500. Process 600 may be used to select an initial node based on the node motion direction criteria.

Optionally, at 610 the network element can identify a plurality of potential node motion directions. The plurality of potential node motion directions can be identified based on the node motion direction corresponding to each moving communication node in the plurality of moving communication nodes. The network element may determine for each of the plurality of moving communication nodes (e.g. nodes identified at step 520) a node motion direction corresponding to a direction of motion of the moving communication node.

The network element may determine each node motion direction in various ways. For example, the network element may determine each node motion direction by accessing a non-transitory storage memory storing movement patterns for the plurality of moving communication nodes. Where the plurality of moving communication nodes are configured to move according to a specified motion pattern, the specified motion pattern may be stored in motion pattern database in a non-transitory storage memory accessible to the network element (e.g. memory 408). The network element may then access this motion pattern database to determine the node motion direction for each moving communication node. This may be particularly useful where the network element is in data communication with a plurality of satellites or other moving communication nodes that move along a pre-defined (and predictable) motion pattern (i.e. a motion pattern that is known in advance).

Alternately, the network element may determine the node motion direction dynamically for each moving communication node. For instance, the network element may establish data communication between the network element and each moving communication node in the plurality of moving communication nodes. The network element may then determine each node motion direction dynamically following establishment of data communication with the corresponding moving communication node.

At 620, the network element can identify a desired node motion direction. For example, the desired node motion direction may be identified from the plurality of potential node motion directions identified at 610.

The desired node motion direction may be determined in various ways. For example, the desired node motion direction may be identified as the potential node motion direction that enables the data unit to be routed between the network element and the data unit geographic destination using a least number of communication nodes (i.e. a fewest number of hops between nodes). For example, this may be used to evaluate the plurality of moving communication nodes according to a selection criteria intended to minimize transmission delay and/or transmission distance. This may be particularly relevant where the plurality of moving communication nodes in data communication with the network element are connected to separate node cohorts (and in some cases, node cohorts that are unable to establish communication links with one another, such as a satellite constellation lacking a $5^{th}$ link).

For example, as described above in respect of FIG. 3A, a first set of moving communication nodes 320a are connected in a first cohort of moving communication nodes while a second set of moving communication nodes 320b are connected in a second cohort of moving communication nodes.

Each cohort of moving communication nodes may be associated with a specified motion pattern. The network element may then determine that the node motion directions corresponding to the first specified motion pattern are preferable for routing the data unit to the data unit geographic destination.

In some examples, the moving communication nodes in the first set of moving communication nodes may be unable to establish data communication with the moving communication nodes in the second set of moving communication nodes. Accordingly, the selection of the initial node may then limit the routing of the data unit to the corresponding cohort. As a result, selection of the initial node may have a large impact on the overall routing of the data unit.

For example, the network element may determine that the first specified motion pattern is preferable because it enables the data unit to be routed between the network element and the data unit geographic destination using a least number of communication nodes. This may also reduce the transmission distance for the data unit. In some cases, this may also reduce the transmission delay for the data unit (although other operational characteristics, such as the traffic load through the nodes and/or node cohorts may also influence the delay). The network element may then select one of the moving communication nodes in the first set of moving communication nodes as the initial node.

The network element may determine that the first cohort of moving communication nodes provides a first data unit route to the data unit geographic destination. The network element may also determine that the second cohort of moving communication nodes provides a second data unit route to the data unit geographic destination. The network element may determine that the node motion directions corresponding to the first specified motion pattern are preferable by determining that the first data unit route is preferable to the second data unit route. For example, the network element may determine that the first data unit route is preferable to the second data unit route in response to determining that the first data unit route has a lower delay than the second data unit route.

At 630, the network element may select an initial node from the plurality of moving communication nodes based on the data unit geographic destination and the node motion direction of the initial node. The initial node may be selected as a particular moving communication node corresponding to the desired node motion direction.

As noted above, FIG. 3A illustrates an example of a communication system in which the moving communication nodes are arranged in a Walker Delta constellation. In this configuration, half the satellites (e.g. nodes 320a moving in a south-easterly direction 322a) move in one direction while the other half (e.g. nodes 320b moving in a north-easterly direction 322b) move in the opposite latitudinal but same longitudinal direction. In addition, a Walker Delta constellation may omit a $5^{th}$ link (i.e. satellites moving in more or less orthogonal directions may omit a data link).

As illustrated, in a dense Walker Delta, a network element (e.g. ground station/terminal 350a) can connect/attach to multiple satellites 320 moving in roughly orthogonal directions. For example, a network element in the form of ground station 350a may connect to satellites 320a1 and 320b1 simultaneously. The ground station 350a may receive a data unit (e.g. a packet) with a geographical destination address 350b to the north-east of ground station 350a.

The ground station 350a can reduce the number of satellites that a data unit needs to traverse if the ground station 350a selects the node 320b1 as the initial node (i.e. the ground station selects to send the packet to the node 320b1 that is moving from south-west to north-east toward the destination on an ascending pass) rather than sending the data unit to the satellite 320a1 that is moving from northwest to south-east on a descending pass. The data unit may then reach the destination 350b using only two hops between moving communication nodes to reach node 320b2 that is proximate the destination 350b (i.e. using only three intermediate communication nodes including the initial node 320b1 and the final node 320b2). The data packet may be routed to the destination 350b using a suitable routing process, e.g. using Orthodromic or PWSPF routing to calculate the shortest Orthodromic distance.

In some examples, the ground terminal/station 350a could select the south-east ward travelling satellite 320a1 as the initial node. Routing the data unit through this descending cohort would result in the data unit travelling a further distance requiring four hops between moving communication nodes to reach node 320a2 proximate the destination 350b (i.e. using five intermediate communication nodes including the initial node 320a1 and the final node 320a2). In many circumstances, this may be undesirable due to the potential for increased delay. However, there may be circumstances in which the selection criteria applied by a network element may still select the node 320a1 as the initial node (e.g. due to selection criteria relating to the operational characteristics of the particular nodes 320 and/or node cohorts as described in further detail below with reference to FIG. 7).

Figure 3B:
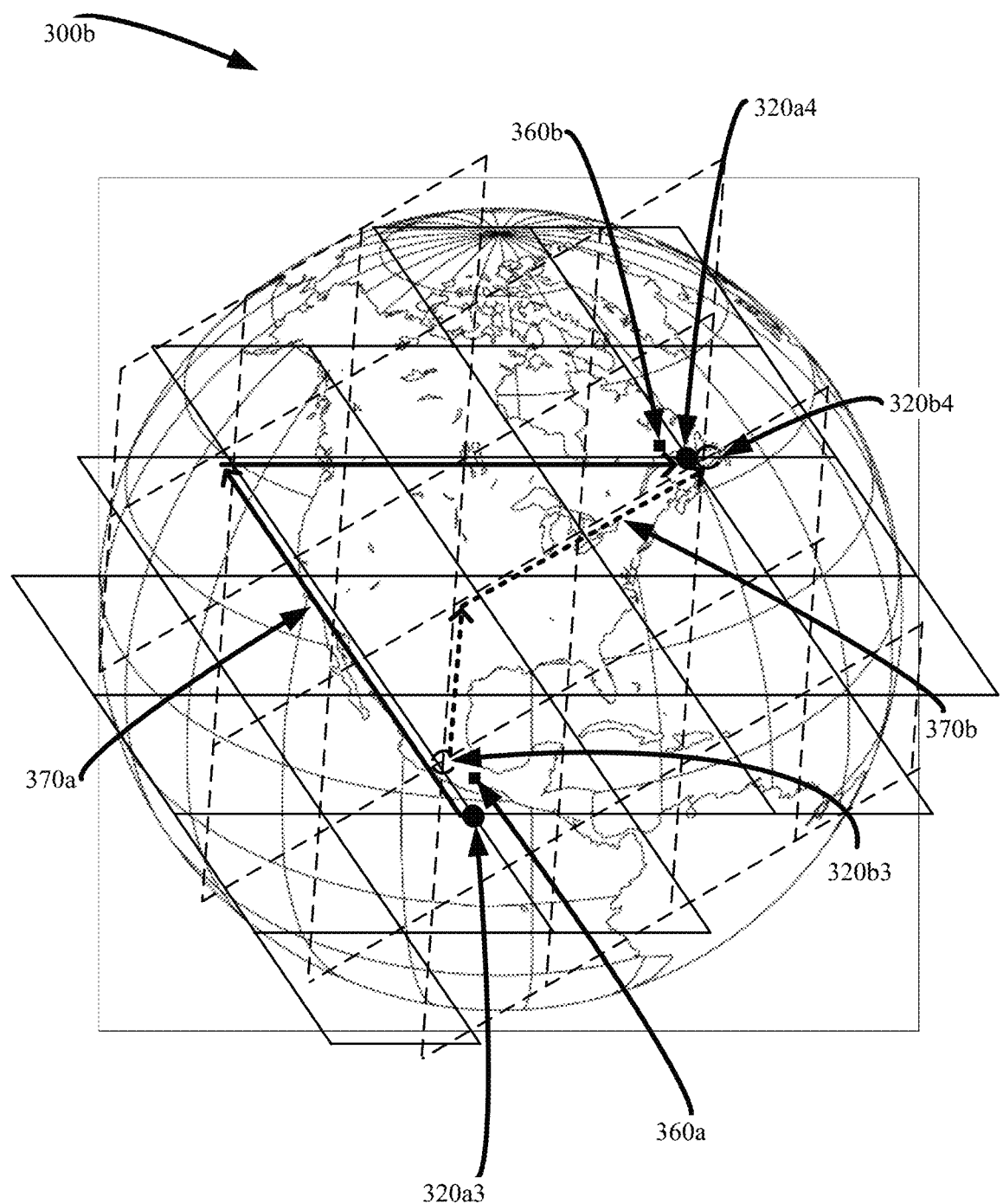
FIG. 3B is a diagram illustrating a simplified schematic of potential data routes between a network element and a destination device using an arrangement of communication nodes such as may be provided by the communication systems of FIGS. 1, 2 and 3A.

FIG. 3B illustrates a further example of a communication system 300b that includes a first set of moving communication nodes and a second set of moving communication nodes corresponding to communication system 300a shown in FIG. 3A. In the example of communication system 300b, the majority of the communication nodes have been omitted for clarity except for nodes 320a3. 320a4. 320b3 and 320b4.

As shown in FIG. 3B, a network element in the form of ground station 360a may establish concurrent data links with satellites 320a3 and 320b3. The ground station 360a may receive a data unit (e.g. a packet) with a geographical destination address 360b to the north-east of ground station 360a. The ground station 360a may then select between the node 320a3 and 320b3 as the initial node to which the data unit is transmitted. The ground station 360a may apply one or more selection criteria to determine which of the nodes 320a3 and 32b3 is selected as the initial node.

As illustrated, the ground station 360a can reduce the number of satellites that a data unit needs to traverse if the ground station 360a selects the node 320b3 as the initial node (i.e. the ground station 360a selects to send the data unit to the node 320b3 that is part of the ascending cohort) rather than sending the data unit to the satellite 320a3 that is part of the descending cohort. The data unit may then reach the destination 360b along a data route path 370b that requires only three hops between moving communication nodes to reach node 320b4 that is proximate the destination 360b (i.e. using only four intermediate communication nodes including the initial node 320b3 and the final node 320b4). The data packet may be routed to the destination 360b using a suitable routing process, e.g. using Orthodromic or PWSPF routing to calculate the shortest Orthodromic distance.

Alternately, the ground station 360a may select the node 320a3 as the initial node. As shown in FIG. 3B, the data unit may then reach the destination 360b along a data route path 370a that requires six hops between moving communication nodes to reach node 320a4 that is proximate the destination 360b (i.e. using only seven intermediate communication nodes including the initial node 320a3 and the final node 320a4). As noted above, while this data route path 370a may include additional nodes to reach the destination 360*b*, there may be circumstances in which the selection criteria applied by a network element may still select the node 320*a*3 as the initial node.

In some cases, the network element may also evaluate one or more operational characteristics to determine that the first data unit route has a lower delay than the second data unit route. For instance, the network element may determine that the first data unit route results in a reduced delay based on evaluating the traffic through the first data unit route and the second data unit route.

Alternately, however, the network element may determine that the second data unit route has reduced delay relative to the first data unit route even though the first data unit route requires less distance to be travelled. The network element may determine that the second data unit route has reduced delay relative to the first data unit route based on operational characteristics associated with the first data unit route and the second data unit, such as traffic load levels and/or CPU loads.

In alternate configurations, the moving communication nodes 320*a* in the first set of moving communication nodes may be operable to establish data communication with the moving communication nodes 320*b* in the second set of moving communication nodes. This may allow the data unit to be routed to the destination 350*b* with minimal delay, while increasing the complexity of the node selection and routing processing required.

Determining, by the network element, that the first data unit route has a lower distance and/or delay may require knowledge of the entire end to end route for the data unit. While this may be the case in many networks (e.g. using satellite constellations with well-established motion patterns), networks with more complex topologies and/or with ad hoc data links may not allow the entire end to end route to be determined. Accordingly, the network element may select the initial node based on operational characteristics and/or motion data relating only to the nearest nodes and/or subset of nodes.

In some examples, the network element may use the data unit geographic destination address in conjunction with the node motion direction of individual nodes to select the initial node. For example, the satellite orbital direction and/or angle may be used to select an initial communication node from a plurality of satellite node. A first example process for selecting the initial node based on a node motion direction and satellite orbital angle will now be described with reference to FIG. 9.

Figure 9:
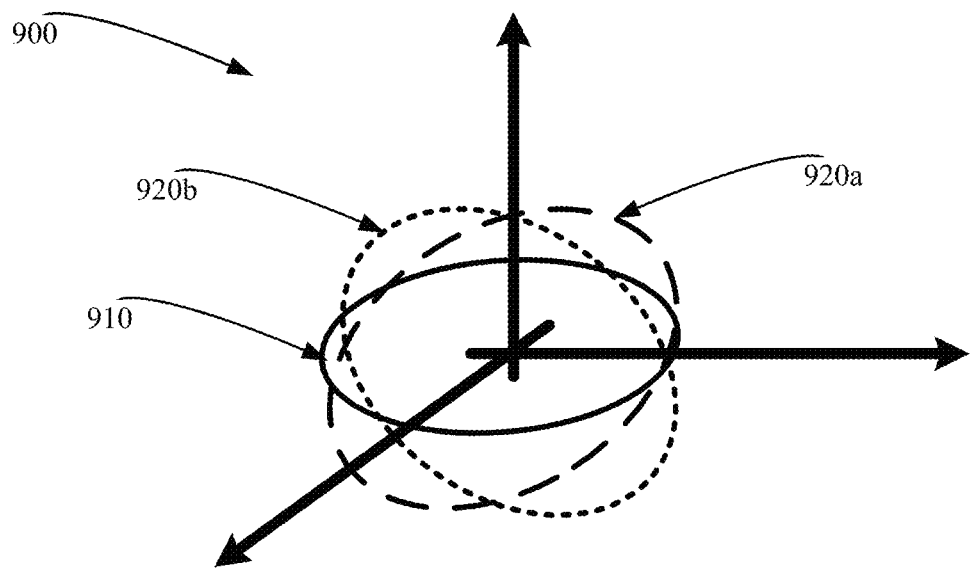
FIG. 9 is a diagram illustrating a simplified plot of the motion direction of a plurality of communication nodes.

FIG. 9 illustrates a plot 900 showing an example of a geodesic 910 and orbital planes 920*a* and 920*b* (referred to collectively as orbital planes 920) corresponding to a first moving communication node and a second moving communication node respectively. In the example illustrated, the first moving communication node and the second moving communication node are both satellites. The geodesic 910 is the great circle that connects the data unit's ground source (e.g. the network element) to its ground destination (e.g. the data unit geographic destination).

The network element may be configured to select the satellite in an orbital plane 920 with the smallest angle with the geodesic 910. In the example described, the earth's rotation is disregarded.

The angle between two planes is equal to the angle between their normals. Accordingly, determining the angle between the normal of two planes can be used to determine the angle between the planes.

Figure 10:
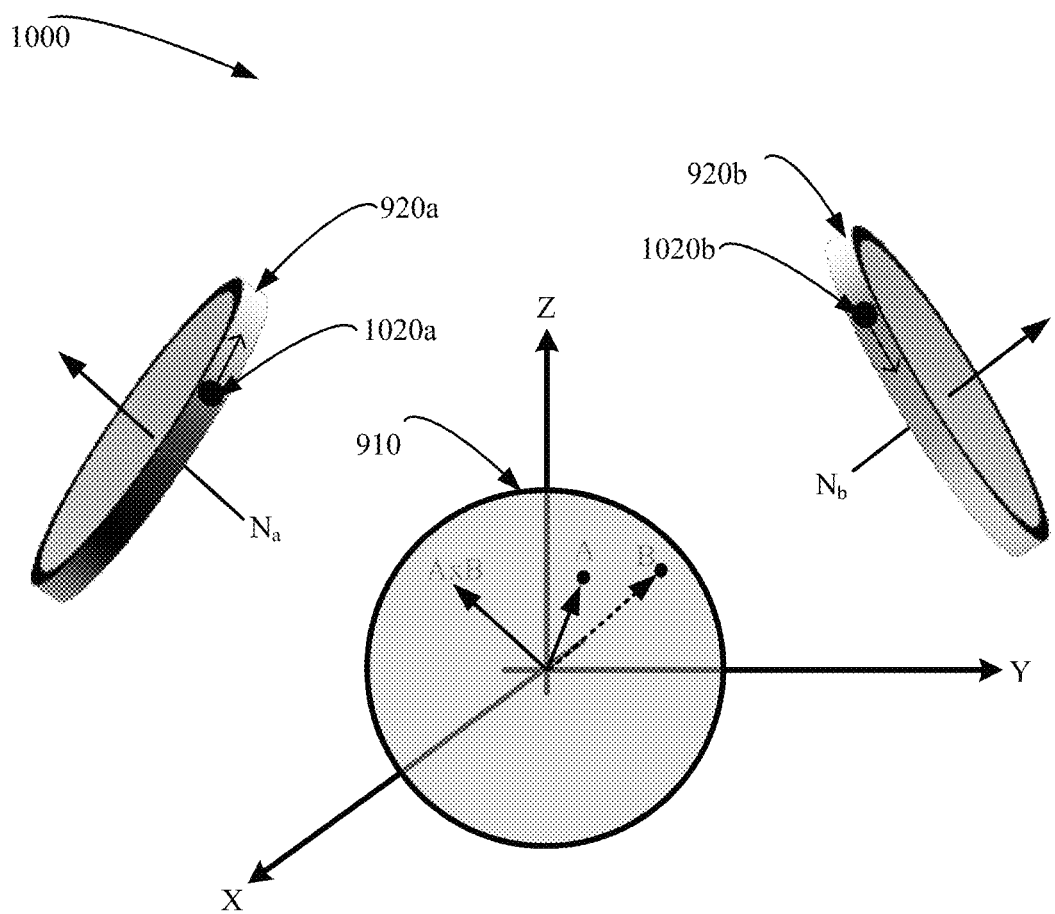
FIG. 10 is a diagram illustrating a decomposed plot of the motion direction of a plurality of communication nodes.

FIG. 10 illustrates a decomposed plot 1000 corresponding to the plot 900 shown in FIG. 9. In the example shown in plot 1000, the geodesic 910, orbital plane 920*a* and orbital plane 920*b* are shown as three non-overlaid tracks.

The normal to an orbital plane 920 is equivalent to the axis of rotation for the orbital plane 920. The normal vector for a given plane 920*i* can be identified as $N_i$. Plot 1000 illustrates the normal vector $N_a$ for the orbital plane 920*a* corresponding to a satellite 1020*a* and the normal vector $N_b$ for the orbital plane 920*b* corresponding to a satellite 1020*b*.

The normal vector for the geodesic can be identified as N 9. N 9 can be determined as the cross product of two locations on the geodesic 910. The normal vector N 9 of the geodesic 910 may be obtained by crossing the position vector of the source (i.e. the position vector of the network element) with the position vector of the destination (i.e. the position vector of the data unit geographic destination).

For example, vectors identifying a source location A and a destination location B on the geodesic 910 may be used. If A=[a1, a2, a3] and B=[b1, b2, b3] then N 9 can be determined as the cross product A×B=[a2b3−a3b2, a3b1−a1b3, a1b2−a2b1].

Then the angle between the given orbital plane 920*i* and the geodesic 910 can be determined using the dot product. The normal vector N 9 of the geodesic can be dotted with the normal vectors $N_i$ of the orbit plane of each satellite within range of the network element. The largest dot product indicates an orbital plane 920 that best follows the geodesic 910. The satellite corresponding to this orbital plane may then be selected as the initial node where the selection is determined using a hop-count-dominated selection criterion or set of selection criteria. The dot product between the given orbital plane 920*i* and the geodesic 910 can be determined as:

$$\cos\theta_i = \frac{N_g N_i}{|N_g||N_i|}$$

This results in the cosine of the angle between the geodesic 910 and the orbital planes 920. This calculation can be repeated for orbital plane 920 of each satellite coupled to a network element. In some cases, the dot products for the orbital planes 920 may be normalized. The initial node may then be selected as the satellite corresponding to the orbital plane with the smallest angle with respect to the geodesic 910.

Alternately, the network element may use the data unit geographic destination address in conjunction with a ground track corresponding to the moving communication node in order to select the initial node. For example, the network element may select the satellite in the orbit with the ground track closest to the geodesic 910. Various techniques may be used to estimate the ground track that correspond most closely to the geodesic 910. For example, the distance between the ground track corresponding to a given communication node and the geodesic 910 can be integrated. Alternately, the slope of the ground tracks may be estimated. Alternately, a closed form expression for a ground tracker may be developed to compute the ground track using numerical methods In some examples, the node motion direction that corresponds most closely to the ground track from the network element to the data unit geographic destination may be identified as the preferred node motion direction. The moving communication node corresponding to that node motion direction may then be selected as the initial node. An example process for determining the initial node motion direction is described above in the context of a satellite constellation. However, embodiments described herein may also operate with communication networks using different configurations of moving communication nodes and/or different types of nodes.

For example, the moving communication nodes may be configured to establish node cohorts in a more ad hoc manner (e.g. omitting a predefined motion pattern for the node cohort). The network element may then select the node motion direction that is closest to a direct path from the network element to the data unit geographic destination.

Figure 7:
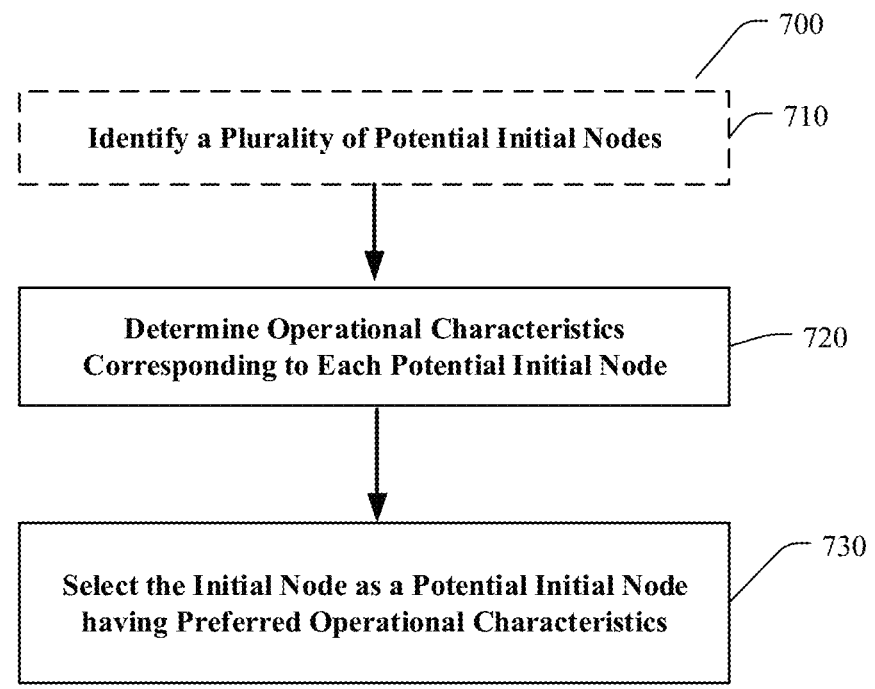
FIG. 7 is a flowchart illustrating another example process for selecting the initial node that may be used by the example process shown in FIG. 5.

Referring now to FIG. 7, shown therein is a process 700 for evaluating each moving communication node according to an operational characteristic selection criteria. Process 700 is an example process that may be used at steps 530 and 540 of process 500. Process 700 may be used to select an initial node based on the operational characteristic criteria.

Optionally, at 710 the network element can identify a plurality of potential initial nodes. The potential initial nodes may be identified as the plurality of moving communication nodes in data communication with the network element.

At 720, the network element can determine operational characteristics for each potential initial node. As noted above, the network element may evaluate various types of operational characteristics for a given potential initial node. For example, the network element may determine node specific operational characteristics such as operational characteristics relating to a given potential initial node, and/or node cohort operational characteristics such as operational characteristics relating to a node cohort corresponding to the given potential initial node and/or link operational characteristics relating to the operational characteristics of the data link between the network element and the given potential initial node.

Examples of node specific operational characteristics may include a node traffic load, a node power dissipation level, a node energy storage level, a node CPU load level, a node I/O buffer level, a node link time period (e.g. the time period that the node will remain in range of the network element), expected future links (e.g. communication nodes expected to be in range next and the time they each of those nodes stay in range) and so on. Evaluating the node specific operational characteristics for the potential initial nodes may allow the initial node to be selected in a manner that promotes greater operational efficiency for all of the potential initial nodes while also providing for high quality data transmission for a given data unit.

The node traffic load may define a present volume rate of data traversing a given node. The node traffic load may be defined as an absolute value and/or a relative value representing the portion of available traffic that the node can handle.

The node energy storage level may define a present level of energy stored by the given node (e.g. the level of power stored by onboard energy storage elements such as batteries). The node energy storage level may be defined as an absolute value and/or a relative value representing the available energy remaining for that node. The node energy storage level may be determined in conjunction with a node energy capacity (defining the maximum energy storage level for the node) and/or a node power requirement (e.g. defining the power required by the node to transmit data).

The node power dissipation level may define a present level of power dissipation or drain given the current operations of the node. The node power dissipation level may be defined as an absolute value and/or a relative value representing the stored power that is dissipated for that node over a specified time period.

The node CPU load level may define a present level of CPU load given the current operations of the node. The node CPU load level may be defined as an absolute value and/or a relative value representing the portion of available CPU load that is currently being used by the node.

The node I/O buffer level may define a present level of buffer load given the current operations of the node. The node I/O buffer level may be defined as an absolute value and/or a relative value representing the portion of available buffer capacity that is currently being used by the node.

Examples of node cohort operational characteristics may include a cohort portion traffic load a cohort portion power dissipation level, a cohort portion energy storage level, a cohort portion CPU load level and so on. The node cohort portion operational characteristics may be generally similar to the node-specific operational characteristics, except considering multiple nodes within a node cohort rather than the single node that is in data communication with the network element. For example, the individual node traffic loads for each node within a given node cohort may be summed to determine the network traffic load for the corresponding node cohort.

In some cases, the node cohort operational characteristics may consider all of the nodes within a given node cohort. Alternately, the node cohort operational characteristics may only consider the nodes likely to be required to transmit a data unit to a data unit geographic destination. In some cases, the node cohort operational characteristics may consider all of the nodes within a subset of the given network.

Evaluating the node cohort operational characteristics for the node cohorts corresponding to the potential initial nodes may allow the initial node to be selected in a manner that promotes greater operational efficiency for multiple node cohorts while also providing for high quality data transmission for a given data unit.

To determine the operational characteristics of the potential initial nodes, the network element can establish data communication with each moving communication node in the plurality of moving communication nodes. The network element may then determine the operational characteristics dynamically following establishment of the data communication for the corresponding moving communication node. The network element may receive operational characteristic data corresponding to each moving communication node following completion of an initial attachment phase.

At 730, the network element can select the initial node as a particular potential initial node having preferred operational characteristics. Based on the operational characteristic data from the potential initial nodes (determined at 720), the network element may select the initial node to satisfy one or more operational characteristic criteria and/or combined criteria (i.e. criteria taking into account both operational characteristics and node motion direction data). Examples of operational characteristic criteria may include a power conservation criteria that may be used to select moving communication nodes with higher power levels in order to preserve power in other nodes and/or a node load minimization criteria that may be used to select moving communication nodes with lower CPU load in order to preserve CPU utilization on the other potential initial nodes or node cohorts. An example of a combined selection criteria may be a transmission delay minimization criteria.

For example, the network element may identify a low-traffic node (or cohort) based on the ascending or descending traffic load for each node (or the traffic load for the corresponding cohort). The network element may then select the initial node as the low-traffic node (or the node corresponding to the low-traffic cohort) according to a traffic load balancing and/or traffic load protection selection criteria. This may allow data flow within an orbital direction to be managed based on traffic load for the node or its cohort.

Where the network element identifies a low-traffic node cohort, the network element may select the initial node as the potential initial node corresponding to the low-traffic node cohort. The network element may transmit the data unit to the initial node and include routing data to instruct the initial node to route the data unit through the low-traffic node cohort. For example, the network element may set a routing direction bit in a header (e.g. an Orthodromic or PWSPF header) indicating that the data unit be routed using communication nodes in the low-traffic cohort (e.g. satellites moving in a particular orbital direction in the example shown in FIG. 3A).

Figure 8:
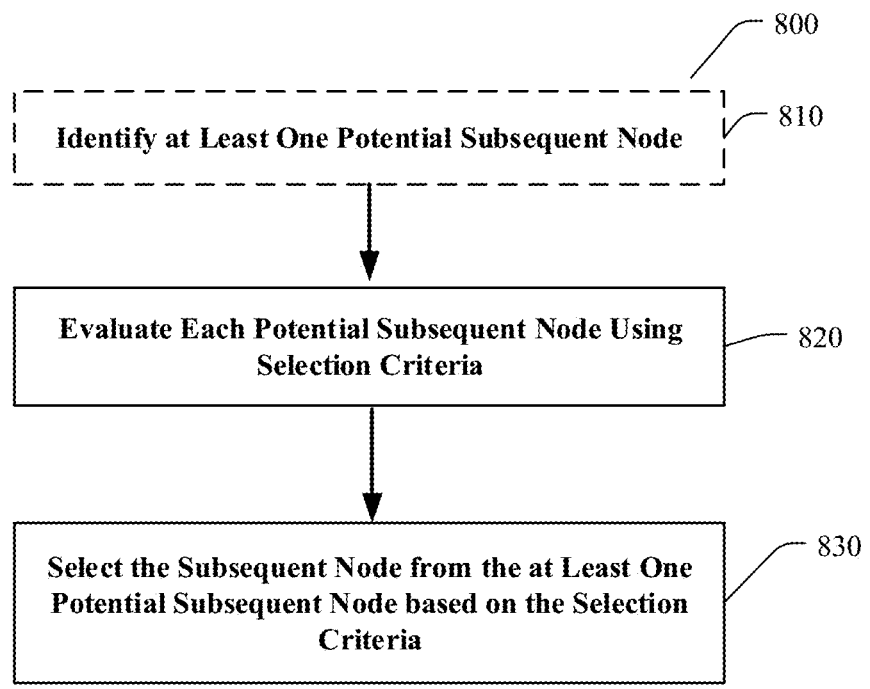
FIG. 8 is a flowchart illustrating an example process for selecting a subsequent node that may be used by the example process shown in FIG. 5.

Referring now to FIG. 8, shown therein is an example process 800 for selecting a subsequent node. Process 800 is an example process that may be used in conjunction with processes 500, 600 and 700. Process 800 may be used to select a subsequent node for routing a data unit based on one or more node selection criteria. Process 800 may be implemented by a network element and/or a communication node depending on the particular implementation of process 800.

As noted above, a data unit may be routed to a data unit geographic destination via a data unit route that includes the initial node and at least one subsequent node. While the selection of the initial node can play an important role in the effective operation of a communication system, so too can the selection of the subsequent node or nodes. In some cases, the selection of one or more subsequent nodes may be performed by the network element transmitting a data unit.

Alternately or in addition, the selection of a subsequent node may be performed by a communication node involved in the process of routing the data unit to its data unit geographic destination. For example, the selection of each subsequent node may be performed at the preceding node in the data unit route.

Optionally, at 810 at least one potential subsequent node may be identified for a data transmission. The at least one potential subsequent node may be identified to include the moving communication nodes in data communication with the preceding node in a data unit route to which a data unit could be routed.

For example, referring back to the example shown in FIG. 3A, the initial node 320b1 is in data communication with (i.e. has established data links 330b to) four different nodes within the corresponding ascending cohort. Accordingly, each of the four nodes in data communication with the initial node 320b1 may be identified as potential subsequent nodes. In alternate examples, for instance where the initial node 320b1 also includes a 5$^{th}$ link to nodes in a different cohort, the at least one potential subsequent node may also include one or more potential subsequent nodes corresponding to the different cohort.

At 820, each of the potential subsequent nodes may be evaluated according to one or more selection criteria. The evaluation of the potential subsequent nodes at 820 may be applied in a manner generally analogous to the evaluation of potential initial nodes at 530 (and the related process 600 for evaluating a moving communication node according to a node motion direction selection criteria and process 700 for evaluating a moving communication node according to an operational characteristic selection criteria) described herein above. Similar to the example processes described above to select an initial node, various types of selection criteria may be used to evaluate the potential subsequent nodes. Evaluating the selection criteria may involve analyzing the motion direction and/or operational characteristics associated with potential subsequent nodes and/or node cohorts associated with the potential subsequent nodes.

For example, a subsequent node motion direction may be determined for each of the potential subsequent nodes. The subsequent node motion direction can be determined to correspond to a direction of motion of the potential subsequent node. This may be advantageous where the communication network includes communication nodes that do not move in a pre-defined manner or include links that are established on an ad hoc basis.

In some cases, the subsequent node motion direction may be determined by the network element transmitting the data unit to the initial node. For example, the network element may determine the subsequent node motion direction based on stored motion pattern data corresponding to the node cohort associated with the subsequent node.

Alternately, the subsequent node motion direction may be determined by the preceding node. For example, the subsequent node motion direction may be determined following a communication link being established between the preceding node and the potential subsequent node. The preceding node may receive motion direction data from one or more potential subsequent nodes in order to determine the respective subsequent node motion directions.

At 830, the subsequent node may be selected from at least one potential subsequent node (e.g. at least one potential subsequent node that may be determined at 810). The subsequent node may be selected based on the evaluation performed at 820. For example, the subsequent node may be selected as the potential subsequent node that best satisfies the selection criteria evaluated at 820.

For example, the subsequent node may be selected from the at least one potential subsequent node based on the subsequent node motion direction of the subsequent node. As with the selection of the initial node, various criteria and techniques may be used to select the subsequent node.

In some examples, the at least one subsequent node may be selected by the network element. For example, the network element may select the entire data unit route where the data unit route can be determined in advance. The network element may then define one or more routing bits that can be used by the intermediate nodes to select the subsequent nodes.

In some examples, the subsequent node may be selected by the preceding node. For example the preceding node may employ various routing techniques, such as PWSPF and/or orthodromic routing.

In some examples, the nodes may store routing tables usable to select the subsequent node. For instance, where the preceding node implements a PWSPF routing technique, the preceding node can select a target node with the shortest Orthodromic distance to the destination among all the other nodes in its routing table. The preceding node may then select the subsequent node as the potential subsequent node that provides the shortest path to this target node. In some cases, the preceding node may select the target node from a plurality of potential target nodes using the same, or similar, selection criteria as those described above in relation to the evaluation and selection of initial nodes and/or subsequent nodes. This may be particularly useful where the preceding node is capable of establishing communication links with moving communication nodes in different cohorts (e.g. walker-delta satellite constellations with a 5$^{th}$ link).

The shortest path may be determined using various algorithmic techniques, such as using Dijkstra's algorithm. The data unit can then be transmitted using routing methods such as source/segment routing to send the packet to this target node. The target node may then repeat a similar process to route the data unit to a further subsequent node. This process may continue at each intermediate node (or at least each target node) until the data unit reaches its destination.

In some examples, the preceding node may use additional data to select the route to a target node. For example, a preceding node may identify two potential subsequent nodes that are equally spaced from the preceding and/or two potential subsequent nodes having an equal Orthodromic distance to data unit's destination. The preceding node may then apply other selection criteria (such as the selection criteria described herein above) to select the subsequent node.

As will be apparent to a person of skill in the art, certain adaptations and modifications of the described methods can be made, and the above discussed embodiments of communication systems, devices and processes should be considered to be illustrative and not restrictive.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. In other instances, well-known methods, procedures and components have not been described in detail so as not to obscure the description of the embodiments. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A routing method implemented by a network element, the routing method comprising:
    determining, for each moving electronic communication node of a plurality of moving electronic communication nodes in wireless data communication with the network element, a respective node motion direction corresponding to a direction of motion of the each moving electronic communication node;
    selecting an initial node from the plurality of moving electronic nodes; and
    transmitting an electronic data unit to the initial node, wherein the routing method further includes at least one of following condition 1 or condition 2:
    condition 1:
        wherein the initial node is selected from a first set of moving electronic communication nodes, and wherein the plurality of moving electronic communication nodes comprises:
            the first set of moving electronic communication nodes, the first set of moving electronic communication nodes having first membership in a first cohort of moving electronic communication nodes, wherein the first cohort of moving electronic communication nodes has a first specified motion pattern, and the first set of moving electronic communication nodes move in first corresponding node motion directions according to the first specified motion pattern, and
            a second set of moving electronic communication nodes, the second set of moving electronic communication nodes having second membership in a second cohort of moving electronic communication nodes, wherein the second cohort of moving electronic communication nodes has a second specified motion pattern, and the second set of moving electronic communication nodes move in second corresponding node motion directions according to the second specified motion pattern,
        wherein moving electronic communication nodes in the first set of moving electronic communication nodes are unable to establish data communication with moving electronic communication nodes in the second set of moving electronic communication nodes; and
        a first data unit route to a data unit geographic destination provided by the first cohort of moving electric communication nodes is preferable to a second data unit route provided by the second cohort of moving electric communication nodes; or
    condition 2:
        the initial node is a node corresponding to low-traffic direction, wherein each node motion direction corresponds to its direction traffic load.

2. The routing method of claim 1, wherein the selecting the initial node comprises:
    identifying a desired node motion direction as the node motion direction that enables the electronic data unit to be routed between the network element and the data unit geographic destination using a least number of communication nodes.

3. The routing method of claim 1, further comprising,
    routing the electronic data unit to the data unit geographic destination via a data unit route that includes the initial node and at least one subsequent node; and
    for each subsequent node of the at least one subsequent node, selecting the subsequent node by:
    identifying at least one potential subsequent node;
    determining, for each of the potential subsequent nodes, a subsequent node motion direction corresponding to a direction of motion of the potential subsequent node; and
    selecting the subsequent node from the at least one potential subsequent node based on the subsequent node motion direction of the subsequent node.

4. The routing method of claim 1, wherein the first data unit route is determined to be preferable to the second data unit route in response to determining that the first data unit route has a lower delay than the second data unit route.

5. The routing method of claim 1, wherein the each moving electronic communication node in the plurality of moving electronic communication nodes is a satellite in orbit around the Earth.

6. The routing method of claim 1, further comprising:
    identifying a plurality of potential initial nodes from the plurality of moving electronic communication nodes based on the respective node motion direction for each potential initial node of the plurality of potential initial nodes;

determining operational characteristics of each potential initial node; and selecting the initial node as a particular potential initial node having preferred operational characteristics.

7. The routing method of claim 1, further comprising:

identifying a secure data unit route satisfying a set of geographic avoidance criteria for the electronic data unit, the set of geographic avoidance criteria specifying at least one geographic region required to be avoided by a communication link; and selecting the initial node as a moving communication node having the node motion direction capable of establishing the secure data unit route.

8. The routing method of claim 1, wherein a destination device of the electronic data unit is different from the initial node, and wherein the plurality of moving electronic communication nodes include a subset of moving electronic communication nodes, the determining comprising:

determining respective node motion directions of the subset of moving electronic communication nodes based on a predefined motion pattern stored in a database and predefined before the determining the respective node motion directions.

9. An apparatus comprising:

at least one processor; and a non-transitory computer readable storage medium storing processor executable instructions for execution by the at least one processor, the processor executable instructions including instructions causing the apparatus to perform operations including:

determining, for each moving electronic communication node of a plurality of moving electronic communication nodes in wireless data communication with the apparatus, a respective node motion direction corresponding to a direction of motion of the each moving electronic communication node;

selecting an initial node from the plurality of moving electronic communication nodes; and transmit an electronic data unit to the initial node, wherein the operations further include at least one of following condition 1 or condition 2:

condition 1:

wherein the initial node is selected from a first set of moving electronic communication nodes, and wherein the plurality of moving electronic communication nodes comprises:

the first set of moving electronic communication nodes, the first set of moving electronic communication nodes having first membership in a first cohort of moving electronic communication nodes, wherein the first cohort of moving electronic communication nodes has a first specified motion pattern, and the first set of moving electronic communication nodes move in first corresponding node motion directions according to the first specified motion pattern, and a second set of moving electronic communication nodes, the second set of moving electronic communication nodes having second membership in a second cohort of moving electronic communication nodes, wherein the second cohort of moving electronic communication nodes has a second specified motion pattern, and the second set of moving electronic communication nodes move in second corresponding node motion directions according to the second specified motion pattern, wherein moving electronic communication nodes in the first set of moving electronic communication nodes are unable to establish data communication with moving electronic communication nodes in the second set of moving electronic communication nodes; and a first data unit route to a data unit geographic destination provided by the first cohort of moving electric communication nodes is preferable to a second data unit route provided by the second cohort of moving electric communication nodes; or condition 2:

the initial node is a node corresponding to low-traffic direction, wherein each node motion direction corresponds to its direction traffic load.

10. The apparatus of claim 9, wherein the selecting the initial node comprises:

identifying a desired node motion direction as the node motion direction that enables the electronic data unit to be routed between the apparatus and the data unit geographic destination using a least number of communication nodes.

11. The apparatus of claim 9, the operations further comprising:

routing the electronic data unit to the data unit geographic destination via a data unit route that includes the initial node and at least one subsequent node; and for each subsequent node of the at least one subsequent node, selecting the subsequent node by:

identifying at least one potential subsequent node;

determining, for each of the potential subsequent nodes, a subsequent node motion direction corresponding to a direction of motion of the potential subsequent node; and selecting the subsequent node from the at least one potential subsequent node based on the subsequent node motion direction of the subsequent node.

12. The apparatus of claim 9, wherein the first data unit route is determined to be preferable to the second data unit route in response to determining that the first data unit route has a lower delay than the second data unit route.

13. The apparatus of claim 9, wherein the each moving electronic communication node in the plurality of moving electronic communication nodes is a satellite in orbit around the Earth.

14. The apparatus of claim 9, the operations further comprising:

identifying a plurality of potential initial nodes from the plurality of moving electronic communication nodes based on the respective node motion direction for each potential initial node of the plurality of potential initial nodes;

determining operational characteristics of each potential initial node; and selecting the initial node as a particular potential initial node having preferred operational characteristics.

15. The apparatus of claim 9, the operations further comprising:

identifying a secure data unit route satisfying a set of geographic avoidance criteria for the electronic data unit, the set of geographic avoidance criteria specifying at least one geographic region required to be avoided by a communication link; and selecting the initial node as a moving communication node having the node motion direction capable of establishing the secure data unit route.

16. The apparatus of claim 9, the operations further comprising:
  establishing respective data communication between the apparatus and the each moving electronic communication node in the plurality of moving electronic communication nodes; and
  determining the respective node motion direction dynamically following establishment of the respective data communication.

17. The apparatus of claim 9, wherein a destination device of the electronic data unit is different from the initial node, and wherein the plurality of moving electronic communication nodes include a subset of moving electronic communication nodes, the determining comprising:
  determining respective node motion directions of the subset of moving electronic communication nodes based on a predefined motion pattern stored in a database and predefined before the determining the respective node motion directions.

18. An apparatus comprising:
  at least one processor; and
  a non-transitory computer readable storage medium storing processor executable instructions for execution by the at least one processor, the processor executable instructions including instructions causing the apparatus to perform operations including:
  receiving an electronic data unit;
  determining, for each moving electronic communication node of a plurality of moving electronic communication nodes in wireless data communication with a satellite, a respective node motion direction corresponding to a direction of motion of the each moving electronic communication node;
  selecting a node from the plurality of moving electronic communication nodes; and
  transmitting the electronic data unit to the node,
  wherein the operations further includes at least one of following condition 1 or condition 2:
  condition 1:
    wherein the node is selected from a first set of moving electronic communication nodes, and wherein the plurality of moving electronic communication nodes comprises:
      the first set of moving electronic communication nodes, the first set of moving electronic communication nodes having first membership in a first cohort of moving electronic communication nodes, wherein the first cohort of moving electronic communication nodes has a first specified motion pattern, and the first set of moving electronic communication nodes move in first corresponding node motion directions according to the first specified motion pattern, and
      a second set of moving electronic communication nodes, the second set of moving electronic communication nodes having second membership in a second cohort of moving electronic communication nodes, wherein the second cohort of moving electronic communication nodes has a second specified motion pattern, and the second set of moving electronic communication nodes move in second corresponding node motion directions according to the second specified motion pattern,
    wherein moving electronic communication nodes in the first set of moving electronic communication nodes are unable to establish data communication with moving electronic communication nodes in the second set of moving electronic communication nodes; and
      a first data unit route to a data unit geographic destination provided by the first cohort of moving electric communication nodes is preferable to a second data unit route provided by the second cohort of moving electric communication nodes; or
  condition 2:
    the node corresponds to low-traffic direction, wherein each node motion direction corresponds to its direction traffic load.

19. The apparatus of claim 18, wherein the selecting the node comprises:
  identifying a desired node motion direction as the node motion direction that enables the electronic data unit to be routed between the apparatus and the data unit geographic destination using a least number of communication nodes.

20. The apparatus of claim 18, the operations further comprising:
  routing the electronic data unit to the data unit geographic destination via a data unit route that includes the node and at least one subsequent node; and
  for each subsequent node of the at least one subsequent node, selecting the subsequent node by:
  identifying at least one potential subsequent node;
  determining, for each of the potential subsequent nodes, a subsequent node motion direction corresponding to a direction of motion of the potential subsequent node; and
  selecting the subsequent node from the at least one potential subsequent node based on the subsequent node motion direction of the subsequent node.

21. The apparatus of claim 18, wherein the first data unit route is determined to be preferable to the second data unit route in response to determining that the first data unit route has a lower delay than the second data unit route.

22. The apparatus of claim 18, wherein a destination device of the electronic data unit is different from the node, and wherein the plurality of moving electronic communication nodes include a subset of moving electronic communication nodes, the determining comprising:
  determining respective node motion directions of the subset of moving electronic communication nodes based on a predefined motion pattern stored in a database and predefined before the determining the respective node motion directions.

\* \* \* \* \*